US012470942B2

(12) United States Patent
Lee et al.

(10) Patent No.: US 12,470,942 B2
(45) Date of Patent: Nov. 11, 2025

(54) TECHNIQUES FOR DYNAMIC SPECTRUM SHARING BETWEEN RADIO ACCESS TECHNOLOGIES

(71) Applicant: QUALCOMM Incorporated, San Diego, CA (US)

(72) Inventors: Hyojin Lee, San Diego, CA (US); Hwan Joon Kwon, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 17/674,822

(22) Filed: Feb. 17, 2022

(65) Prior Publication Data

US 2023/0262471 A1 Aug. 17, 2023

(51) Int. Cl.
*H04W 16/14* (2009.01)
*H04L 5/00* (2006.01)
*H04W 24/08* (2009.01)
*H04W 48/10* (2009.01)

(52) U.S. Cl.
CPC ............ *H04W 16/14* (2013.01); *H04L 5/001* (2013.01); *H04L 5/0048* (2013.01); *H04W 24/08* (2013.01); *H04W 48/10* (2013.01)

(58) Field of Classification Search
CPC ..... H04W 16/14; H04W 24/08; H04W 48/10; H04W 24/10; H04W 48/12; H04W 48/01; H04W 88/10; H04L 5/001; H04L 5/0048; H04L 2001/0093; H04L 1/0026
See application file for complete search history.

(56) References Cited

U.S. PATENT DOCUMENTS

| 12,177,889 | B2 * | 12/2024 | Yi | H04W 74/002 |
|---|---|---|---|---|
| 2018/0295664 | A1 * | 10/2018 | Tang | H04W 48/18 |
| 2021/0022150 | A1 | 1/2021 | Nammi et al. | |
| 2021/0076197 | A1 | 3/2021 | Novlan et al. | |
| 2021/0266095 | A1 | 8/2021 | Kumar et al. | |
| 2022/0124511 | A1 * | 4/2022 | Kim | H04W 76/28 |
| 2022/0256315 | A1 * | 8/2022 | Lei | H04W 72/1263 |

(Continued)

FOREIGN PATENT DOCUMENTS

| WO | 2020167221 A1 | 8/2020 |
|---|---|---|
| WO | 2021022395 A1 | 2/2021 |

*Primary Examiner* — Abdullahi Ahmed
(74) *Attorney, Agent, or Firm* — Holland & Hart LLP/Qualcomm

(57) ABSTRACT

Methods, systems, and devices for wireless communications are described. A user equipment (UE) may receive a broadcast message via a cell associated with a network entity. The broadcast message may include an indication that the cell supports a first radio access technology (RAT) and a second RAT. In some examples, the first RAT may be associated with a first subcarrier spacing (SCS) and the second RAT may be associated with a second SCS. The UE may perform measurements of one or more reference signals associated with the first RAT based on the indication. In some examples, the one or more reference signals may be multiplexed with physical downlink shared channel (PDSCH) data. The UE may transmit a channel feedback report to the network entity based on performing measurements of the one or more reference signals, and may demodulate the PDSCH data using the first SCS and the second SCS.

28 Claims, 17 Drawing Sheets

(56) References Cited

U.S. PATENT DOCUMENTS

| | | | | |
|---|---|---|---|---|
| 2022/0322130 | A1* | 10/2022 | Muruganathan | H04L 5/005 |
| 2023/0016918 | A1* | 1/2023 | Marupaduga | H04W 72/541 |
| 2023/0028317 | A1* | 1/2023 | Yoon | H04W 72/1215 |
| 2024/0179728 | A1* | 5/2024 | Hou | H04W 72/30 |
| 2024/0267939 | A1* | 8/2024 | Wei | H04W 64/006 |
| 2024/0297767 | A1* | 9/2024 | Sangal | H04L 1/1812 |
| 2024/0323951 | A1* | 9/2024 | Behura | H04L 5/0051 |

* cited by examiner

TECHNIQUES FOR DYNAMIC SPECTRUM SHARING BETWEEN RADIO ACCESS TECHNOLOGIES

FIELD OF TECHNOLOGY

The following relates to wireless communications, including techniques for dynamic spectrum sharing (DSS) between radio access technologies (RATs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a cell that supports a first radio access technology (RAT) and a second RAT may employ various dynamic spectrum sharing (DSS) techniques to enable devices associated with the first RAT and devices associated with the second RAT to communicate within a radio frequency (RF) spectrum band. However, conventional DSS techniques may not fully support coexistence between fifth generation (5G) RATs and sixth generation (6G) RATs.

SUMMARY

The described techniques relate to improved methods, systems, devices, and apparatuses that support techniques for dynamic spectrum sharing (DSS) between radio access technologies (RATs). For example, the described techniques may support more efficient utilization of communication resources in a radio frequency (RF) spectrum band that supports multiple RATs. In accordance with aspects of the present disclosure, A user equipment (UE) may receive a broadcast message via a cell associated with a network entity. The broadcast message may include an indication that the cell supports a first RAT and a second RAT. In some examples, the first RAT may be associated with a first subcarrier spacing (SCS) and the second RAT may be associated with a second SCS. The UE may perform measurements of one or more reference signals associated with the first RAT based on receiving the indication. In some examples, the one or more reference signals may be multiplexed with physical downlink shared channel (PDSCH) data. The UE may transmit a channel feedback report to the network entity based on performing measurements of the one or more reference signals, and may demodulate the PDSCH data using both the first SCS and the second SCS.

A method for wireless communications at a UE is described. The method may include receiving a broadcast message via a cell associated with a network entity, the broadcast message including an indication that the cell supports a first RAT and a second RAT, performing measurements of one or more reference signals associated with the first RAT based on the indication that the cell supports the first RAT and the second RAT, and transmitting, to the network entity, a channel feedback report associated with the second RAT, the channel feedback report including an indication of one or more channel state feedback parameters that are based on the measurements of the one or more reference signals.

An apparatus for wireless communications at a UE is described. The apparatus may include a processor, memory coupled with the processor, and instructions stored in the memory. The instructions may be executable by the processor to cause the apparatus to receive a broadcast message via a cell associated with a network entity, the broadcast message including an indication that the cell supports a first RAT and a second RAT, perform measurements of one or more reference signals associated with the first RAT based on the indication that the cell supports the first RAT and the second RAT, and transmit, to the network entity, a channel feedback report associated with the second RAT, the channel feedback report including an indication of one or more channel state feedback parameters that are based on the measurements of the one or more reference signals.

Another apparatus for wireless communications at a UE is described. The apparatus may include means for receiving a broadcast message via a cell associated with a network entity, the broadcast message including an indication that the cell supports a first RAT and a second RAT, means for performing measurements of one or more reference signals associated with the first RAT based on the indication that the cell supports the first RAT and the second RAT, and means for transmitting, to the network entity, a channel feedback report associated with the second RAT, the channel feedback report including an indication of one or more channel state feedback parameters that are based on the measurements of the one or more reference signals.

A non-transitory computer-readable medium storing code for wireless communications at a UE is described. The code may include instructions executable by a processor to receive a broadcast message via a cell associated with a network entity, the broadcast message including an indication that the cell supports a first RAT and a second RAT, perform measurements of one or more reference signals associated with the first RAT based on the indication that the cell supports the first RAT and the second RAT, and transmit, to the network entity, a channel feedback report associated with the second RAT, the channel feedback report including an indication of one or more channel state feedback parameters that are based on the measurements of the one or more reference signals.

Some examples of the method, apparatuses, and non-transitory computer-readable medium described herein may further include operations, features, means, or instructions for receiving the one or more reference signals over at least a subset of a bandwidth of a component carrier (CC) associated with the cell.

In some examples of the method, apparatuses, and non-transitory computer-readable medium described herein, receiving the broadcast message may include operations, features, means, or instructions for receiving the broadcast message via the cell, the broadcast message indicating that the one or more reference signals are applicable to the first RAT and the second RAT and generating the channel feedback report associated with the second RAT based on the broadcast message.

In some examples of the method, apparatuses, and non-transitory computer-readable medium described herein, receiving the broadcast message may include operations, features, means, or instructions for receiving the broadcast message that includes a physical broadcast channel (PBCH) transmission within a synchronization signal block (SSB), the PBCH transmission including one or more bits that indicate whether the cell supports the first RAT, the second RAT, or both and determining that the cell supports the first RAT and the second RAT based on the one or more bits.

Some examples of the method, apparatuses, and non-transitory computer-readable medium described herein may further include operations, features, means, or instructions for performing a synchronization procedure for communication with the cell according to the second RAT based on receiving the one or more reference signals via a CC associated with the cell.

Some examples of the method, apparatuses, and non-transitory computer-readable medium described herein may further include operations, features, means, or instructions for receiving an SSB via a CC associated with the cell, the SSB including the one or more reference signals and performing a synchronization procedure for communication with the cell according to the first RAT or the second RAT based on receiving the SSB.

In some examples of the method, apparatuses, and non-transitory computer-readable medium described herein, performing the measurements of the one or more reference signals may include operations, features, means, or instructions for performing a set of time-frequency tracking measurements of the one or more reference signals, where the one or more channel state feedback parameters are based on the set of time-frequency tracking measurements.

Some examples of the method, apparatuses, and non-transitory computer-readable medium described herein may further include operations, features, means, or instructions for receiving a second broadcast message via a CC associated with the cell, the second broadcast message including information that is specific to the second RAT.

Some examples of the method, apparatuses, and non-transitory computer-readable medium described herein may further include operations, features, means, or instructions for receiving an SSB that indicates a set of time and frequency resources allocated for transmission of the second broadcast message.

In some examples of the method, apparatuses, and non-transitory computer-readable medium described herein, the one or more reference signals include tracking reference signals (TRS), channel state information reference signals (CSI-RS), cell-specific reference signals (CRS), or a combination thereof.

In some examples of the method, apparatuses, and non-transitory computer-readable medium described herein, the first RAT includes a fifth generation (5G) RAT and the second RAT includes a sixth generation (6G) RAT.

A method for wireless communications at a network entity is described. The method may include transmitting a broadcast message via a cell associated with the network entity, the broadcast message including an indication that the cell supports a first RAT and a second RAT, transmitting one or more reference signals associated with the first RAT based on the indication that the cell supports the first RAT and the second RAT, and receiving, from a UE, a channel feedback report associated with the second RAT, the channel feedback report including an indication of one or more channel state feedback parameters that are based on the one or more reference signals.

An apparatus for wireless communications at a network entity is described. The apparatus may include a processor, memory coupled with the processor, and instructions stored in the memory. The instructions may be executable by the processor to cause the apparatus to transmit a broadcast message via a cell associated with the network entity, the broadcast message including an indication that the cell supports a first RAT and a second RAT, transmit one or more reference signals associated with the first RAT based on the indication that the cell supports the first RAT and the second RAT, and receive, from a UE, a channel feedback report associated with the second RAT, the channel feedback report including an indication of one or more channel state feedback parameters that are based on the one or more reference signals.

Another apparatus for wireless communications at a network entity is described. The apparatus may include means for transmitting a broadcast message via a cell associated with the network entity, the broadcast message including an indication that the cell supports a first RAT and a second RAT, means for transmitting one or more reference signals associated with the first RAT based on the indication that the cell supports the first RAT and the second RAT, and means for receiving, from a UE, a channel feedback report associated with the second RAT, the channel feedback report including an indication of one or more channel state feedback parameters that are based on the one or more reference signals.

A non-transitory computer-readable medium storing code for wireless communications at a network entity is described. The code may include instructions executable by a processor to transmit a broadcast message via a cell associated with the network entity, the broadcast message including an indication that the cell supports a first RAT and a second RAT, transmit one or more reference signals associated with the first RAT based on the indication that the cell supports the first RAT and the second RAT, and receive, from a UE, a channel feedback report associated with the second RAT, the channel feedback report including an indication of one or more channel state feedback parameters that are based on the one or more reference signals.

Some examples of the method, apparatuses, and non-transitory computer-readable medium described herein may further include operations, features, means, or instructions for transmitting the one or more reference signals over at least a subset of a bandwidth of a CC associated with the cell.

In some examples of the method, apparatuses, and non-transitory computer-readable medium described herein, transmitting the broadcast message may include operations, features, means, or instructions for transmitting the broadcast message via the cell, the broadcast message indicating that the one or more reference signals are applicable to the first RAT and the second RAT, where receiving the channel feedback report associated with the second RAT is based on the broadcast message.

In some examples of the method, apparatuses, and non-transitory computer-readable medium described herein, transmitting the broadcast message may include operations, features, means, or instructions for transmitting the broadcast message that includes a PBCH transmission within an SSB, the PBCH transmission including one or more bits that indicate whether the cell supports the first RAT, the second RAT, or both.

Some examples of the method, apparatuses, and non-transitory computer-readable medium described herein may further include operations, features, means, or instructions for performing a synchronization procedure for communication with the UE according to the second RAT based on transmitting the one or more reference signals via a CC associated with the cell.

Some examples of the method, apparatuses, and non-transitory computer-readable medium described herein may further include operations, features, means, or instructions for transmitting an SSB via a CC associated with the cell, the SSB including the one or more reference signals and performing a synchronization procedure for communication with the UE according to the first RAT or the second RAT based on transmitting the SSB.

In some examples of the method, apparatuses, and non-transitory computer-readable medium described herein, receiving the channel feedback report may include operations, features, means, or instructions for receiving the channel feedback report that includes an indication of the one or more channel state feedback parameters that are based on a set of time-frequency tracking measurements of the one or more reference signals.

Some examples of the method, apparatuses, and non-transitory computer-readable medium described herein may further include operations, features, means, or instructions for transmitting a second broadcast message via a CC associated with the cell, the second broadcast message including information that is specific to the second RAT.

Some examples of the method, apparatuses, and non-transitory computer-readable medium described herein may further include operations, features, means, or instructions for transmitting an SSB that indicates a set of time and frequency resources allocated for transmission of the second broadcast message.

A method for wireless communications at a UE is described. The method may include receiving, via a cell that supports a first RAT and a second RAT, control signaling indicating a DSS configuration for the first RAT and the second RAT, the first RAT associated with a first SCS and the second RAT associated with a second SCS that is different from the first SCS, receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS, and demodulating the first portion of the downlink shared channel data according to the first SCS and the second portion of the downlink shared channel data according to the second SCS.

An apparatus for wireless communications at a UE is described. The apparatus may include a processor, memory coupled with the processor, and instructions stored in the memory. The instructions may be executable by the processor to cause the apparatus to receive, via a cell that supports a first RAT and a second RAT, control signaling indicating a DSS configuration for the first RAT and the second RAT, the first RAT associated with a first SCS and the second RAT associated with a second SCS that is different from the first SCS, receive, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS, and demodulate the first portion of the downlink shared channel data according to the first SCS and the second portion of the downlink shared channel data according to the second SCS.

Another apparatus for wireless communications at a UE is described. The apparatus may include means for receiving, via a cell that supports a first RAT and a second RAT, control signaling indicating a DSS configuration for the first RAT and the second RAT, the first RAT associated with a first SCS and the second RAT associated with a second SCS that is different from the first SCS, means for receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS, and means for demodulating the first portion of the downlink shared channel data according to the first SCS and the second portion of the downlink shared channel data according to the second SCS.

A non-transitory computer-readable medium storing code for wireless communications at a UE is described. The code may include instructions executable by a processor to receive, via a cell that supports a first RAT and a second RAT, control signaling indicating a DSS configuration for the first RAT and the second RAT, the first RAT associated with a first SCS and the second RAT associated with a second SCS that is different from the first SCS, receive, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS, and demodulate the first portion of the downlink shared channel data according to the first SCS and the second portion of the downlink shared channel data according to the second SCS.

In some examples of the method, apparatuses, and non-transitory computer-readable medium described herein, demodulating the downlink shared channel data may include operations, features, means, or instructions for performing a first time to frequency domain conversion on the first portion of the downlink shared channel data using the first SCS and performing a second time to frequency domain conversion on the second portion of the downlink shared channel data using the second SCS.

In some examples of the method, apparatuses, and non-transitory computer-readable medium described herein, receiving the downlink shared channel data may include operations, features, means, or instructions for receiving the first portion of the downlink shared channel data and the second portion of the downlink shared channel data in accordance with a time division multiplexing (TDM) scheme.

In some examples of the method, apparatuses, and non-transitory computer-readable medium described herein, receiving the set of reference signals may include operations, features, means, or instructions for receiving, in accordance with the DSS configuration, one or more CRSs or TRSs that are frequency division multiplexed (FDM) with the first portion of the downlink shared channel data.

In some examples of the method, apparatuses, and non-transitory computer-readable medium described herein, the set of reference signals may be applicable to the first RAT and the second RAT.

In some examples of the method, apparatuses, and non-transitory computer-readable medium described herein, the first SCS includes a SCS of fifteen kilohertz (kHz) and the second SCS includes a SCS of thirty kHz.

A method for wireless communications at a network entity is described. The method may include transmitting, via a cell that supports a first RAT and a second RAT, control signaling indicating a DSS configuration for the first RAT and the second RAT, the first RAT associated with a first SCS and the second RAT associated with a second SCS that is different from the first SCS, transmitting, in accordance with the DSS configuration, a set of reference signals and a first portion of downlink shared channel data in a first set of symbols associated with the first SCS, and transmitting, in accordance with the DSS configuration, a second portion of the downlink shared channel data in a second set of symbols associated with the second SCS.

An apparatus for wireless communications at a network entity is described. The apparatus may include a processor, memory coupled with the processor, and instructions stored in the memory. The instructions may be executable by the processor to cause the apparatus to transmit, via a cell that supports a first RAT and a second RAT, control signaling indicating a DSS configuration for the first RAT and the second RAT, the first RAT associated with a first SCS and the second RAT associated with a second SCS that is different from the first SCS, transmit, in accordance with the DSS configuration, a set of reference signals and a first portion of downlink shared channel data in a first set of symbols associated with the first SCS, and transmit, in accordance with the DSS configuration, a second portion of the downlink shared channel data in a second set of symbols associated with the second SCS.

Another apparatus for wireless communications at a network entity is described. The apparatus may include means for transmitting, via a cell that supports a first RAT and a second RAT, control signaling indicating a DSS configuration for the first RAT and the second RAT, the first RAT associated with a first SCS and the second RAT associated with a second SCS that is different from the first SCS, means for transmitting, in accordance with the DSS configuration, a set of reference signals and a first portion of downlink shared channel data in a first set of symbols associated with the first SCS, and means for transmitting, in accordance with the DSS configuration, a second portion of the downlink shared channel data in a second set of symbols associated with the second SCS.

A non-transitory computer-readable medium storing code for wireless communications at a network entity is described. The code may include instructions executable by a processor to transmit, via a cell that supports a first RAT and a second RAT, control signaling indicating a DSS configuration for the first RAT and the second RAT, the first RAT associated with a first SCS and the second RAT associated with a second SCS that is different from the first SCS, transmit, in accordance with the DSS configuration, a set of reference signals and a first portion of downlink shared channel data in a first set of symbols associated with the first SCS, and transmit, in accordance with the DSS configuration, a second portion of the downlink shared channel data in a second set of symbols associated with the second SCS.

Some examples of the method, apparatuses, and non-transitory computer-readable medium described herein may further include operations, features, means, or instructions for performing a first frequency to time domain conversion on the set of reference signals and the first portion of the downlink shared channel data using the first SCS, where transmitting the set of reference signals and the first portion of the downlink shared channel data is based on performing the first frequency to time domain conversion and performing a second frequency to time domain conversion on the second portion of the downlink shared channel data using the second SCS, where transmitting the second portion of the downlink shared channel data is based on performing the second frequency to time domain conversion.

In some examples of the method, apparatuses, and non-transitory computer-readable medium described herein, transmitting the downlink shared channel data may include operations, features, means, or instructions for transmitting the first portion of the downlink shared channel data and the second portion of the downlink shared channel data in accordance with a TDM scheme.

In some examples of the method, apparatuses, and non-transitory computer-readable medium described herein, transmitting the set of reference signals may include operations, features, means, or instructions for transmitting, in accordance with the DSS configuration, one or more CRSs or TRSs that are FDM-ed with the first portion of the downlink shared channel data.

DETAILED DESCRIPTION

Figure 1:
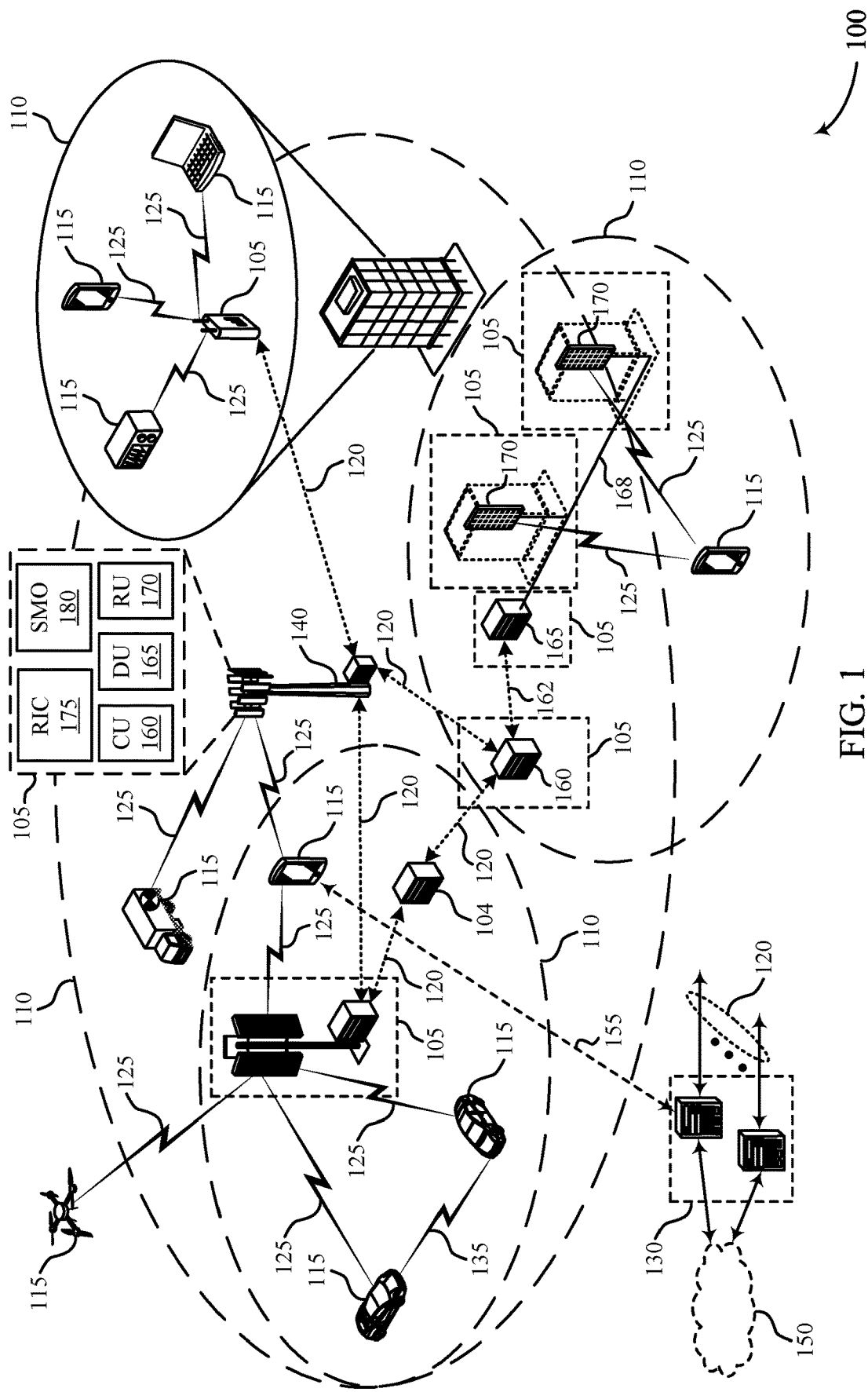
FIGS. 1 and 2 illustrate examples of wireless communications systems that support techniques for dynamic spectrum sharing (DSS) between radio access technologies (RATs) in accordance with one or more aspects of the present disclosure.

In some wireless communications systems, a cell associated with a network entity may support multiple radio access technologies (RATs). For example, a cell may support a fourth generation (4G) RAT and a fifth generation (5G) RAT. To support coexistence between different RATs, a cell may employ dynamic spectrum sharing (DSS) techniques such as cell-specific reference signal (CRS) rate matching, synchronization signal block (SSB) relocation, and demodulation reference signal (DMRS) relocation. These techniques may reduce collisions between 4G communications and 5G communications, and may result in more efficient utilization of communication resources within a radio frequency (RF) spectrum band. However, existing DSS techniques may not fully support coexistence between 5G RATs and sixth generation (6G) RATs.

Aspects of the present disclosure support techniques for improving DSS to support coexistence between 5G RATs and 6G RATs. For example, a user equipment (UE) may perform measurements of an SSB associated with a 5G RAT to acquire synchronization with a cell that supports the 5G RAT and a 6G RAT. More specifically, the UE may receive the SSB associated with the 5G RAT in a carrier that supports DSS between the 5G RAT and the 6G RAT, and may generate a channel feedback report for the 6G RAT based on measuring the SSB associated with the 5G RAT.

Using a 5G SSB (e.g., an SSB associated with a 5G RAT) to acquire synchronization with a 6G cell (e.g., a cell that supports a 6G RAT) may improve the signaling efficiency of synchronization procedures in carriers that support DSS. For example, by transmitting SSBs and reference signals that are applicable to multiple RATs, a cell may refrain from transmitting RAT-specific SSBs and reference signals (e.g., SSBs and reference signals that pertain to a single RAT), which may reduce the number of SSBs and reference signals transmitted by the cell. Thus, the techniques described herein may support more efficient utilization of communication resources on carriers that support multiple RATs.

Aspects of the present disclosure may also support techniques for utilizing different subcarrier spacings (SCSs) within a single time slot. For example, if a network entity is scheduled to transmit physical downlink shared channel (PDSCH) data to a UE during a time slot, the network entity may transmit a first portion of PDSCH data using a first SCS, and may transmit a second portion of the PDSCH data using a second SCS. Utilizing multiple SCSs (also referred to herein as mixed numerologies) within a time slot may enable the network entity to time division multiplex (TDM) the first portion of PDSCH data with the second portion of the PDSCH data, and may also enable the network entity to frequency division multiplex (FDM) some or all of the PDSCH data with reference signals associated with the first SCS or the second SCS.

Using different numerologies within a time slot may result in higher throughput levels and more efficient utilization of communication resources. For example, the techniques described herein may enable a network entity to multiplex PDSCH data with reference signals that are associated with the same SCS, which may enable the network entity to more effectively utilize communication resources. The described techniques may also enable the network entity to multiplex different portions of the PDSCH data in a slot using different numerologies, which may increase the quantity of PDSCH data that the network entity can transmit within the slot.

Aspects of the present disclosure are initially described in the context of wireless communications systems, resource mappings, and process flows. Aspects of the disclosure are further illustrated by and described with reference to apparatus diagrams, system diagrams, and flowcharts that relate to techniques for DSS between RATs.

FIG. 1 illustrates an example of a wireless communications system 100 that supports techniques for DSS between RATs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs (RATs). The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (MC) 175 (e.g., a Near-Real Time MC (Near-RT MC), a Non-Real Time MC (Non-RT MC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120).

IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein. In the case of the techniques described herein applied in the context of a disaggregated RAN architecture, one or more components of the disaggregated RAN architecture may be configured to support techniques for DSS between RATs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with one or more downlink component carrier (CC) and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT). The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and SCS may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SCS. Each slot may include a quantity of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple CCs. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a network entity 105 or a UE 115) may be performed using multiple beam directions, and the device may use a combination of digital precoding or RF beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a CRS, a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some wireless communications systems may support 5G DSS techniques, which may enable soft migration prior to repurposing an LTE carrier (e.g., a 4G channel bandwidth) as a 5G carrier (e.g., a 5G channel bandwidth). These 5G DSS techniques may include CRS rate-matching techniques (e.g., RB-level rate matching or RE-level rate matching), NR SSB relocation techniques, and alternative DMRS location techniques, among other examples. These techniques may reduce collisions between 4G communications and 5G communications, and may result in more efficient utilization of communication resources within a carrier that supports DSS (e.g., a 5G and 6G coexistence band, a 4G and 5G coexistence band). However, existing DSS techniques may still have increased overhead when compared to carriers where DSS is not used, and may not fully support coexistence between 5G RATs and 6G RATs.

Aspects of the present disclosure may support 6G DSS techniques, which may encompass 5G DSS techniques for reducing collision between RATs (e.g., using flexible rate-matching and scheduling techniques). For DSS between 6G and 4G, schemes for 5G DSS (e.g., CRS rate-matching, NR SSB relocation, alternative DMRS location) may also be applicable. For DSS between 6G and 5G, the described techniques may support scheduling (e.g., locating) 6G signals such as 6G SSBs or 6G tracking reference signals (TRS) within a carrier employing DSS between 5G and 6G. To support more efficient resource utilization, 6G rate-matching around one or more 5G SSBs, TRSs, or CSI-RSs may also be employed. For DSS between 4G, 5G, and 6G, a combination of the techniques described herein may be utilized to facilitate coexistence between these RATs. The described techniques may result in fewer collisions between signals associated with different RATs. The described techniques may also support DSS for different numerologies (e.g., SCSs).

The wireless communications system 100 may support techniques for more efficient utilization of communication resources in a carrier that supports coexistence between multiple RATs. More specifically, the techniques and operations described with reference to FIG. 1 may support sharing of SSBs and reference signals (e.g., TRS, CSI-RS, CRS) between different RATs, which may improve the signaling efficiency of synchronization procedures for the carrier. For example, a cell that supports different RATs may transmit SSBs or reference signals that are applicable to both RATs. Thus, UEs 115 associated with different RATs can acquire synchronization with the cell using the same SSBs and reference signals, which may reduce the number of SSBs and reference signals transmitted by the cell.

The techniques and operations described with reference to FIG. 1 may also enable a network entity 105 to use mixed (e.g., different) numerologies over at least a portion of a carrier within a single time slot. For example, a network entity 105 may transmit a first portion of PDSCH data over one or more resource blocks in a time slot (e.g., a first set of symbols within the time slot) using a first SCS, and may transmit a second portion of the PDSCH data in the time slot (e.g., in a second set of symbols over the one or more resource blocks within the time slot) using a second SCS that is different from the first SCS. Using different numerologies within a single time slot may result in higher downlink throughput levels and more efficient utilization of communication resources, among other benefits.

Figure 2:
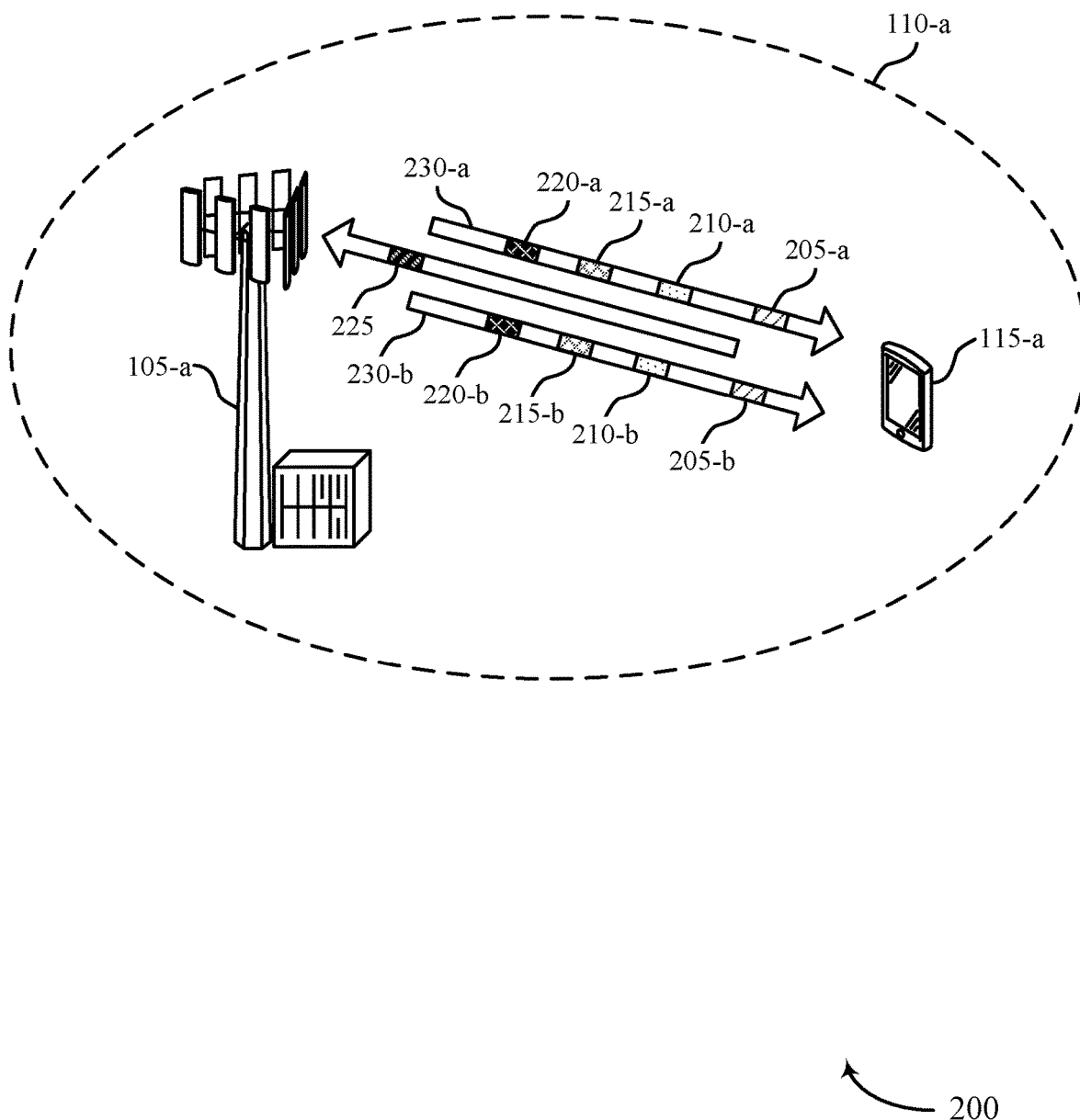

FIG. 2 illustrates an example of a wireless communications system 200 that supports techniques for DSS between RATs in accordance with one or more aspects of the present disclosure. The wireless communications system 200 may implement or be implemented by aspects of the wireless communications system 100. For example, the wireless communications system 200 may include a network entity 105-a and a UE 115-a, which may be examples of corresponding devices described with reference to FIG. 1. The network entity 105-a and the UE 115-a may communicate within a geographic coverage area 110-a, which may be an example of a geographic coverage area 110 described with reference to FIG. 1. In the wireless communications system 200, the UE 115-a may acquire synchronization with a cell of the network entity 105-a by performing measurements on an SSB in a carrier that supports DSS.

The techniques described herein may support symbiotic signal sharing (S-Cube), which may involve sharing signals between 4G or 5G and 6G. For SSB sharing between 5G and 6G, the UE 115-a (e.g., a 6G-capable UE) may acquire synchronization with the network entity 105-a using a 5G SSB in a carrier employing DSS. In some examples, a spare bit in a physical broadcast channel (PBCH) transmission may be used to differentiate 5G-specific cells from cells that support 5G and 6G. Additionally or alternatively, a 6G-dedicated PBCH transmission may provide 6G-specific broadcasting information to the UE 115-a. The techniques described herein may also support sharing TRS, CSI-RS, and CRS between different RATs. Aspects of S-Cube may improve DSS between 4G and 5G. If a cell is configured to utilize S-Cube, the UE 115-a (e.g., a 5G-capable UE) may be able to perform time-frequency tracking and measurements using a 4G CRS.

In the example of FIG. 2, the UE 115-a may communicate with the network entity 105-a in a 6G-specific carrier 230-a, a DSS carrier 230-b (e.g., a DSS carrier that supports 5G and 6G), or both. For example, the UE 115-a may receive control signaling 205-a from the network entity 105-a in the 6G-specific carrier 230-a, and may receive control signaling 205-b from the network entity 105-a in the DSS carrier 230-b. The control signaling 205 may indicate a set of rules for performing DSS between 5G and 6G. For example, the control signaling may configure the UE 115-a to perform measurements for a 6G cell using a 5G SSB (or vice versa). Additionally or alternatively, the control signaling 205 may configure the UE 115-a to decode different portions of a PDSCH transmission using different numerologies (e.g., a 5G SCS and a 6G SCS).

Accordingly, the UE 115-a may receive SSBs 210 via a cell of the network entity 105-a. For example, the UE 115-a may receive an SSB 210-a in the 6G-specific carrier 230-a, and may receive an SSB 210-b in the DSS carrier 230-b. The SSBs 210 may include one or more primary reference signals (PSS), secondary synchronization signals (SSS), or PBCH transmissions. In some examples, the SSBs may span 20 RBs, where 4 RBs are allocated for a first portion of a PBCH transmission, 12 RBs are allocated for a PSS, a second portion of the PBCH transmission, and an SSS (which may be TDM-ed across different symbols), and 4 RBs are allocated for a third portion of the PBCH transmission. In some examples, the network entity 105-*a* may transmit multiple SSBs 210 (e.g., up to L SSBs) in an SSB burst set that spans 5 ms. The SSBs 210 may have a periodicity of 20 ms for initial cell search.

The UE 115-*a* may also receive reference signals 215 via a cell of the network entity 105-*a* that supports 5G and 6G. For example, the UE 115-*a* may receive reference signals 215-*a* from the network entity 105-*a* in the 6G-specific carrier 230-*a*, and may receive reference signals 215-*b* from the network entity 105-*a* in the DSS carrier 230-*b*. The reference signals 215 may include CRS, CSI-RS, or TRS, among other examples. As described herein, the reference signals 215-*b* may be applicable to (e.g., shared by) 5G and 6G. For example, both 5G-capable UEs and 6G-capable UEs may perform measurements of the reference signals 215-*b*, which may reduce the signaling overhead associated with reference signal transmissions in the DSS carrier 230-*b*.

The UE 115-*a* may receive PDSCH data 220 via a cell of the network entity 105-*a* that supports 5G and 6G. For example, the UE 115-*a* may receive a first portion of PDSCH data 220-*a* in the 6G-specific carrier 230-*a*, and may receive a second portion of PDSCH data 220-*b* in the DSS carrier 230-*b*. As described herein, the network entity 105-*a* may transmit the first portion of PDSCH data 220-*a* and the second portion of PDSCH data 220-*b* in the same slot using different numerologies. For example, the network entity 105-*a* may transmit the first portion of PDSCH data 220-*a* using a first SCS (e.g., an SCS configured for the carrier or BWP of the carrier for communication according to the 6G RAT), and may transmit the second portion of PDSCH data 220-*b* using a second SCS (e.g., an SCS configured for the carrier or BWP of the carrier for communication according to the 5G RAT).

The UE 115-*a* may generate a channel feedback report 225 based on performing measurements on the reference signals 215 or the SSBs 210. More specifically, the channel feedback report 225 may include an indication of one or more channel state feedback parameters that are based on the measurements of the reference signals 215 or the SSBs 210. In some examples, the UE 115-*a* may generate the channel feedback report 225 for a 6G cell of the network entity 105-*a* based on performing measurements of 5G SSBs or reference signals within the DSS carrier 230-*b*. Accordingly, the UE 115-*a* may transmit the channel feedback report 225 to the network entity 105-*a*.

The wireless communications system 200 may support techniques for more efficient utilization of communication resources in the DSS carrier 230-*b* that supports coexistence between multiple RATs. More specifically, the techniques and operations described with reference to FIG. 2 may support sharing of SSBs 210 and reference signals 215 (e.g., TRS, CSI-RS, CRS) between different RATs, which may improve the signaling efficiency of synchronization procedures in the DSS carrier 230-*b*. For example, a cell that supports different RATs may transmit SSBs 210 or reference signals 215 that are applicable to both RATs. Thus, UEs 115 associated with different RATs can acquire synchronization with the cell using the same SSBs 210 and reference signals 215, which may reduce the number of SSBs 210 and reference signals 215 transmitted by the cell.

The techniques and operations described with reference to FIG. 2 may also enable the network entity 105-*a* to use mixed (e.g., different) numerologies within a single time slot. For example, the network entity 105-*a* may transmit a first portion of PDSCH data 220-*a* in a time slot (e.g., a first set of symbols within the time slot) using a first SCS, and may transmit a second portion of PDSCH data 220-*b* in the time slot (e.g., in a second set of symbols within the time slot) using a second SCS that is different from the first SCS. Using different numerologies within a single time slot may result in higher throughput levels and more efficient utilization of communication resources, among other benefits.

Figure 3:
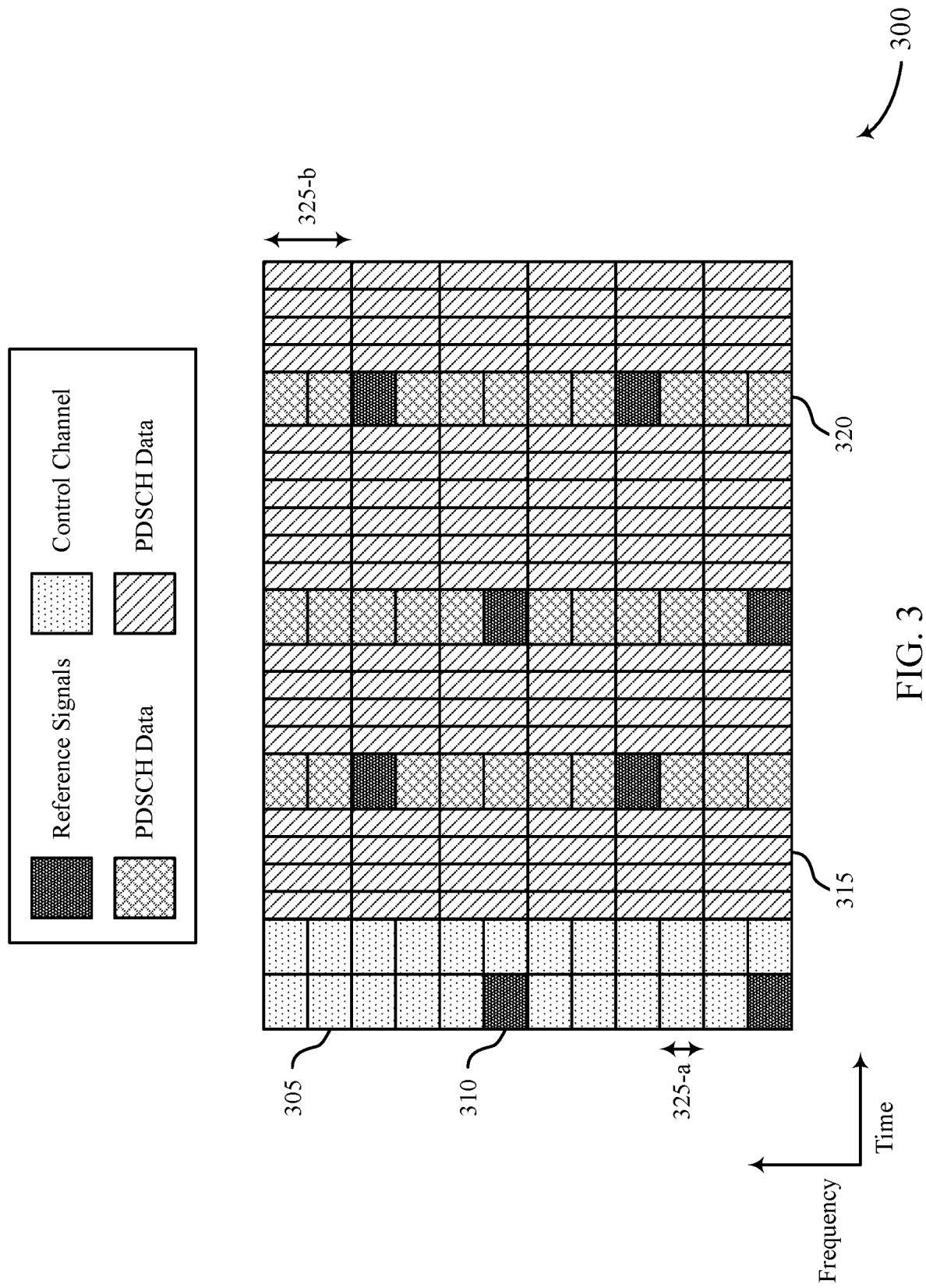
FIG. 3 illustrates an example of a resource mapping that supports techniques for DSS between RATs in accordance with one or more aspects of the present disclosure.

FIG. 3 illustrates an example of a resource mapping 300 that supports techniques for DSS between RATs in accordance with one or more aspects of the present disclosure. The resource mapping 300 may implement or be implemented by aspects of the wireless communications system 100 or the wireless communications system 200. For example, the resource mapping 300 may be implemented by a UE or a network entity, which may be examples of corresponding devices described with reference to FIGS. 1 and 2. In the example of FIG. 3, a network entity may transmit different portions of a PDSCH transmission in a slot using different numerologies.

The resource mapping 300 may support mixed numerologies within a single slot. For example, portions of the same PDSCH transmission can be TDM-ed in symbols associated with different numerologies. For DSS between 4G and 6G, symbols that include CRSs may be associated with a 15 kilohertz (kHz) SCS, whereas symbols without CRSs may be associated with a 30 kHz SCS. For DSS between 5G and 6G, symbols that include TRSs may be associated with a first SCS (e.g., an SCS configured for the carrier or BWP of the carrier for communication according to the 5G RAT), while symbols without TRS may be associated with a second SCS (e.g., an SCS configured for the carrier or BWP of the carrier for communication according to the 6G RAT). In some examples, TRSs may be shared between 5G and 6G. That is, 6G-capable UEs may use 5G TRS to acquire synchronization with a 6G cell (or vice versa).

In the example of FIG. 3, a network entity may use different numerologies (e.g., SCSs) to transmit different subsets of PDSCH data within a single slot. For example, the network entity may use a first SCS 325-*a* (e.g., 15 kHz) to modulate and transmit a first portion of PDSCH data 320 in a first set of symbols of a slot, and may use a second SCS 325-*b* (e.g., 30 kHz) to modulate and transmit a second portion of PDSCH data 315 in a second set of symbols of the slot. In some examples, the first portion of PDSCH data 320 may be TDM-ed with the second portion of PDSCH data 315. Additionally or alternatively, the first portion of PDSCH data 320 may be FDM-ed with reference signals 310, which may include CRS, TRS, or CSI-RS, among other examples. The slot may also include control channel resources 305, which may be allocated for physical downlink control channel (PDCCH) transmissions or other control information.

Accordingly, a UE may demodulate the first portion of PDSCH data 320 using the first SCS 325-*a*, and may demodulate the second portion of PDSCH data 315 using the second SCS 325-*b*. More specifically, the UE may use the first SCS 325-*a* to perform a first time to frequency domain conversion (such as a fast Fourier transform (FFT) conversion) on the first portion of PDSCH data 320, and may use the second SCS 325-*b* to perform a second time to frequency domain conversion on the second portion of PDSCH data 315. Additionally or alternatively, the UE may perform a set of measurements on the reference signals 310, which may be applicable to (e.g., shared by) multiple RATs.

The resource mapping 300 may support techniques for more efficient utilization of communication resources in a carrier that supports coexistence between multiple RATs. More specifically, the techniques and operations described with reference to FIG. 3 may enable a network entity to use mixed (e.g., different) numerologies within a single time slot. For example, the network entity may transmit a first portion of PDSCH data 320 in a time slot (e.g., a first set of symbols within the time slot) using the first SCS 325-a, and may transmit the second portion of the PDSCH data 315 in the time slot (e.g., in a second set of symbols within the time slot) using the second SCS 325-b. Using different numerologies within a single time slot may result in higher downlink throughput levels and more efficient utilization of communication resources, among other benefits.

Figure 4:
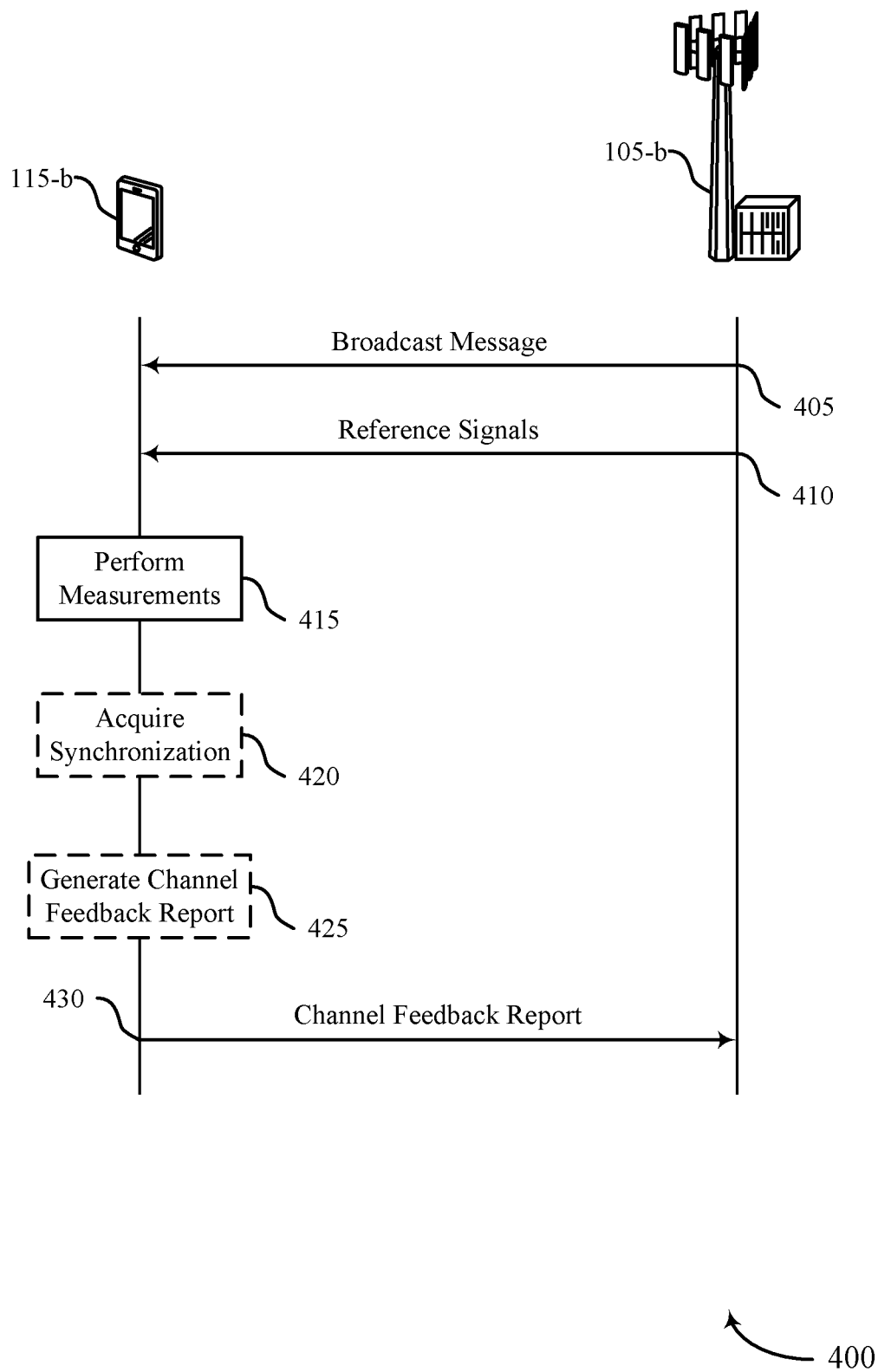
FIGS. 4 and 5 illustrate examples of process flows that support techniques for DSS between RATs in accordance with one or more aspects of the present disclosure.

FIG. 4 illustrates an example of a process flow 400 that supports techniques for DSS between RATs in accordance with one or more aspects of the present disclosure. The process flow 400 may implement or be implemented by aspects of the wireless communications system 100 or the wireless communications system 200. For example, the process flow 400 may include a UE 115-b and a network entity 105-b, which may be examples of corresponding devices described with reference to FIGS. 1 and 2. In the following description of the process flow 400, operations between the UE 115-b and the network entity 105-b may be performed in a different order or at a different time than as shown. Additionally or alternatively, some operations may be omitted from the process flow 400, and other operations may be added to the process flow 400.

The UE 115-b may receive an SSB from a cell associated with the network entity 105-b. The SSB may include a broadcast message (e.g., a PBCH transmission) and one or more reference signals (e.g., CRS, CSI-RS, TRS). At 405, the UE 115-b may receive the broadcast message, which may include an indication that the cell supports a first RAT and a second RAT. More specifically, the broadcast message may include one or more bits indicating whether the cell supports one or both of the first RAT or the second RAT. In some examples, the first RAT may be include a 5G RAT and the second RAT may include a 6G RAT. The broadcast message may also indicate that the one or more reference signals are applicable to the first RAT and the second RAT. Additionally or alternatively, the broadcast message may indicate a set of time and frequency resources allocated for transmission of a second broadcast message (e.g., a second PBCH transmission) that includes information specific to the second RAT.

At 410, the UE 115-b may receive the one or more reference signals over at least a subset of a bandwidth of a CC associated with the cell. The one or more reference signals may be associated with the first RAT. At 415, the UE 115-b may perform measurements of the one or more reference signals based on the indication that the cell supports the first RAT and the second RAT. More specifically, the UE 115-b may perform a set of time-frequency tracking measurements of the one or more reference signals. At 420, the UE 115-b may perform a synchronization procedure for communication with the cell according to one or both of the first RAT or the second RAT based on receiving the one or more reference signals over at least a subset of a bandwidth of a CC associated with the cell.

At 425, the UE 115-b may generate a channel feedback report associated with the second RAT. In some examples, the UE 115-b may generate the channel feedback report based on determining that the cell supports both the first RAT and the second RAT. The channel feedback report may include an indication of one or more channel state feedback parameters that are based on the measurements of the one or more reference signals. At 430, the UE 115-b may transmit the channel feedback report to the network entity 105-b.

The process flow 400 may support techniques for more efficient utilization of communication resources in a carrier that supports coexistence between multiple RATs. More specifically, the techniques and operations described with reference to FIG. 4 may support sharing of SSBs and reference signals (e.g., TRS, CSI-RS, CRS) between different RATs, which may improve the signaling efficiency of synchronization procedures in the carrier. For example, a cell that supports different RATs may transmit SSBs or reference signals that are applicable to both RATs. Thus, UEs associated with different RATs can acquire synchronization with the cell using the same SSBs and reference signals, which may reduce the number of SSBs and reference signals transmitted by the cell.

Figure 5:
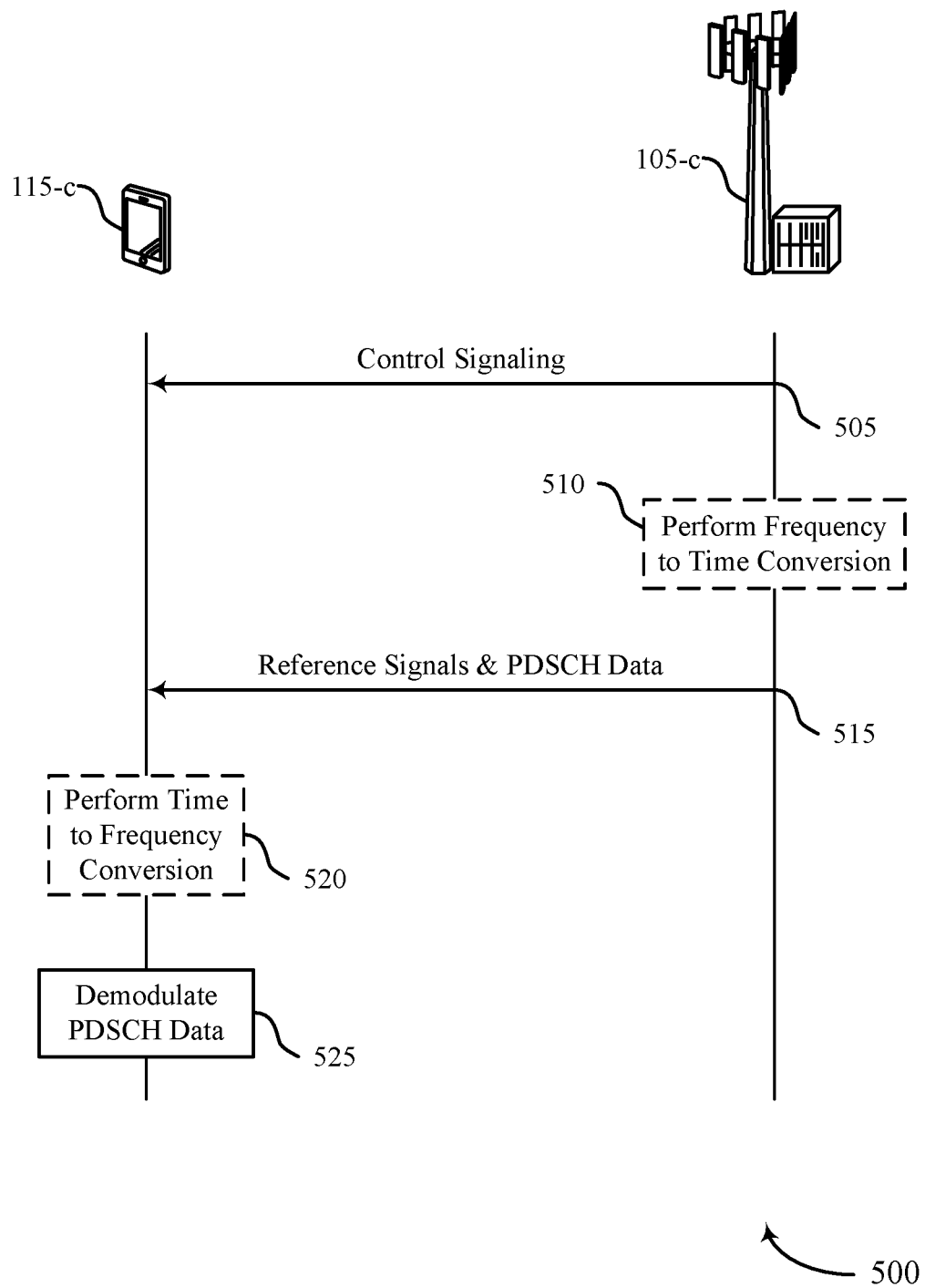

FIG. 5 illustrates an example of a process flow 500 that supports techniques for DSS between RATs in accordance with one or more aspects of the present disclosure. The process flow 500 may implement or be implemented by aspects of the wireless communications system 100 or the wireless communications system 200. For example, the process flow 500 may include a UE 115-c and a network entity 105-c, which may be examples of corresponding devices described with reference to FIGS. 1 and 2. In the following description of the process flow 500, operations between the UE 115-c and the network entity 105-c may be performed in a different order or at a different time than as shown. Additionally or alternatively, some operations may be omitted from the process flow 500, and other operations may be added to the process flow 500.

At 505, the UE 115-c may receive control signaling via a cell of the network entity 105-c that supports a first RAT associated with a first SCS and a second RAT associated with a second SCS. For example, the first RAT may be configured to use the first SCS over the carrier or BWP of the carrier and the second RAT may be configured to use the second SCS over the carrier or BWP of the carrier. The control signaling may include RRC signaling, DCI, a MAC-CE, a SIB, an SSB, or a combination thereof. In some examples, the first SCS may be 15 kHz and the second SCS may be 30 kHz. The control signaling may indicate a DSS configuration for the first RAT and the second RAT (e.g., which may include an indication of the first SCS being configured for the first RAT or an indication of the second SCS being configured for the second RAT). In some examples, the first RAT may be an example of a 5G RAT and the second RAT may be an example of a 6G RAT.

The network entity 105-c may, in some examples, perform a frequency to time domain conversion (e.g., an inverse fast Fourier transform (IFFT) conversion) on a set of reference signals and PDSCH data at 510. At 515, the UE 115-c may receive the set of reference signals and the PDSCH data via the cell associated with the network entity 105-c in accordance with the DSS configuration. More specifically, the UE 115-c may receive the set of reference signals and a first portion of the PDSCH data during a first set of symbols associated with the first SCS, and may receive a second portion of the PDSCH data during a second set of symbols associated with the second SCS. The set of reference signals may include CRSs, TRSs, CSI-RSs, or a combination thereof. In some examples, the set of reference signals may be FDM-ed with the first portion of the PDSCH data.

Additionally or alternatively, the first portion of the PDSCH data may be TDM-ed with the second portion of the PDSCH data.

At 520, the UE 115-*c* may perform a first time to frequency domain conversion (e.g., an FFT conversion) on the first portion of the PDSCH data using the first SCS, and may perform a second time to frequency domain conversion on the second portion of the PDSCH data using the second SCS. Accordingly, the UE 115-*c* may demodulate the PDSCH data at 525. More specifically, the UE 115-*c* may demodulate the first portion of the PDSCH data using the first SCS, and may demodulate the second portion of the PDSCH data using the second SCS. Additionally or alternatively, the UE 115-*c* may use the set of reference signals to acquire synchronization with the cell.

The process flow 500 may support techniques for more efficient utilization of communication resources in a carrier that supports coexistence between multiple RATs. More specifically, the techniques and operations described with reference to FIG. 5 may enable the network entity 105-*c* to use mixed (e.g., different) numerologies within a single time slot. For example, the network entity 105-*c* may transmit a first portion of PDSCH data in a time slot (e.g., a first set of symbols within the time slot) using a first SCS, and may transmit a second portion of the PDSCH data in the time slot (e.g., in a second set of symbols within the time slot) using a second SCS that is different from the first SCS. Using different numerologies within a single time slot may result in higher downlink throughput levels and more efficient utilization of communication resources, among other benefits.

Figure 6:
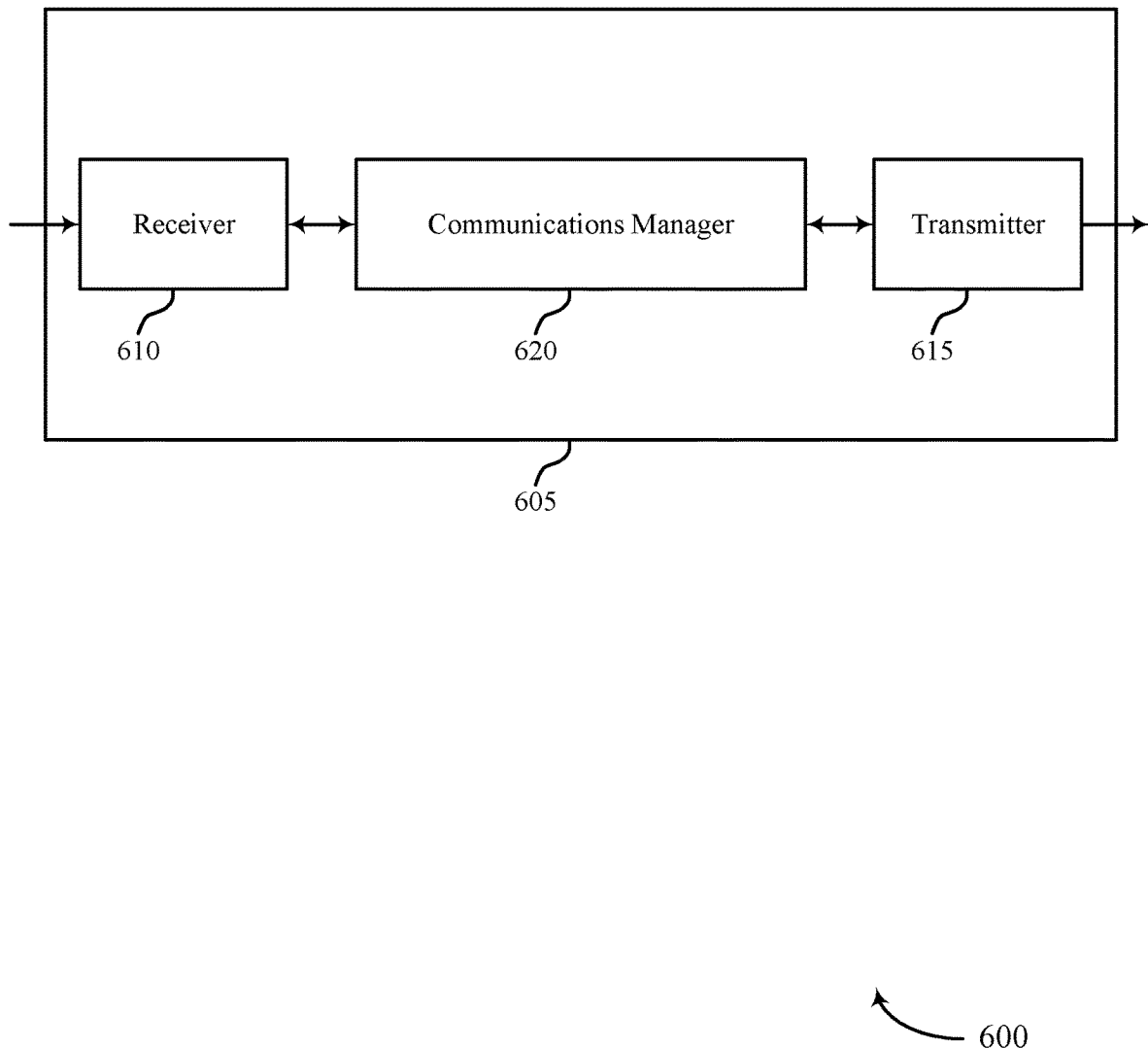
FIGS. 6 and 7 show block diagrams of devices that support techniques for DSS between RATs in accordance with one or more aspects of the present disclosure.

FIG. 6 shows a block diagram 600 of a device 605 that supports techniques for DSS between RATs in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for DSS between RATs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for DSS between RATs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for DSS between RATs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at the device 605 (e.g., a UE 115) in accordance with examples disclosed herein. For example, the communications manager 620 may be configured as or otherwise support a means for receiving a broadcast message via a cell associated with a network entity, the broadcast message including an indication that the cell supports a first RAT and a second RAT. The communications manager 620 may be configured as or otherwise support a means for performing measurements of one or more reference signals associated with the first RAT based on the indication that the cell supports the first RAT and the second RAT. The communications manager 620 may be configured as or otherwise support a means for transmitting, to the network entity, a channel feedback report associated with the second RAT, the channel feedback report including an indication of one or more channel state feedback parameters that are based on the measurements of the one or more reference signals.

Additionally, or alternatively, the communications manager 620 may support wireless communications at the device 605 in accordance with examples disclosed herein. For example, the communications manager 620 may be configured as or otherwise support a means for receiving, via a cell that supports a first RAT and a second RAT, control signaling indicating a DSS configuration for the first RAT and the second RAT, the first RAT associated with a first SCS and the second RAT associated with a second SCS that is different from the first SCS. The communications manager

620 may be configured as or otherwise support a means for receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS. The communications manager 620 may be configured as or otherwise support a means for demodulating the first portion of the downlink shared channel data according to the first SCS and the second portion of the downlink shared channel data according to the second SCS.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources by reducing the signaling overhead associated with SSB transmissions and reference signal transmissions in a carrier that supports DSS between 5G and 6G.

Figure 7:
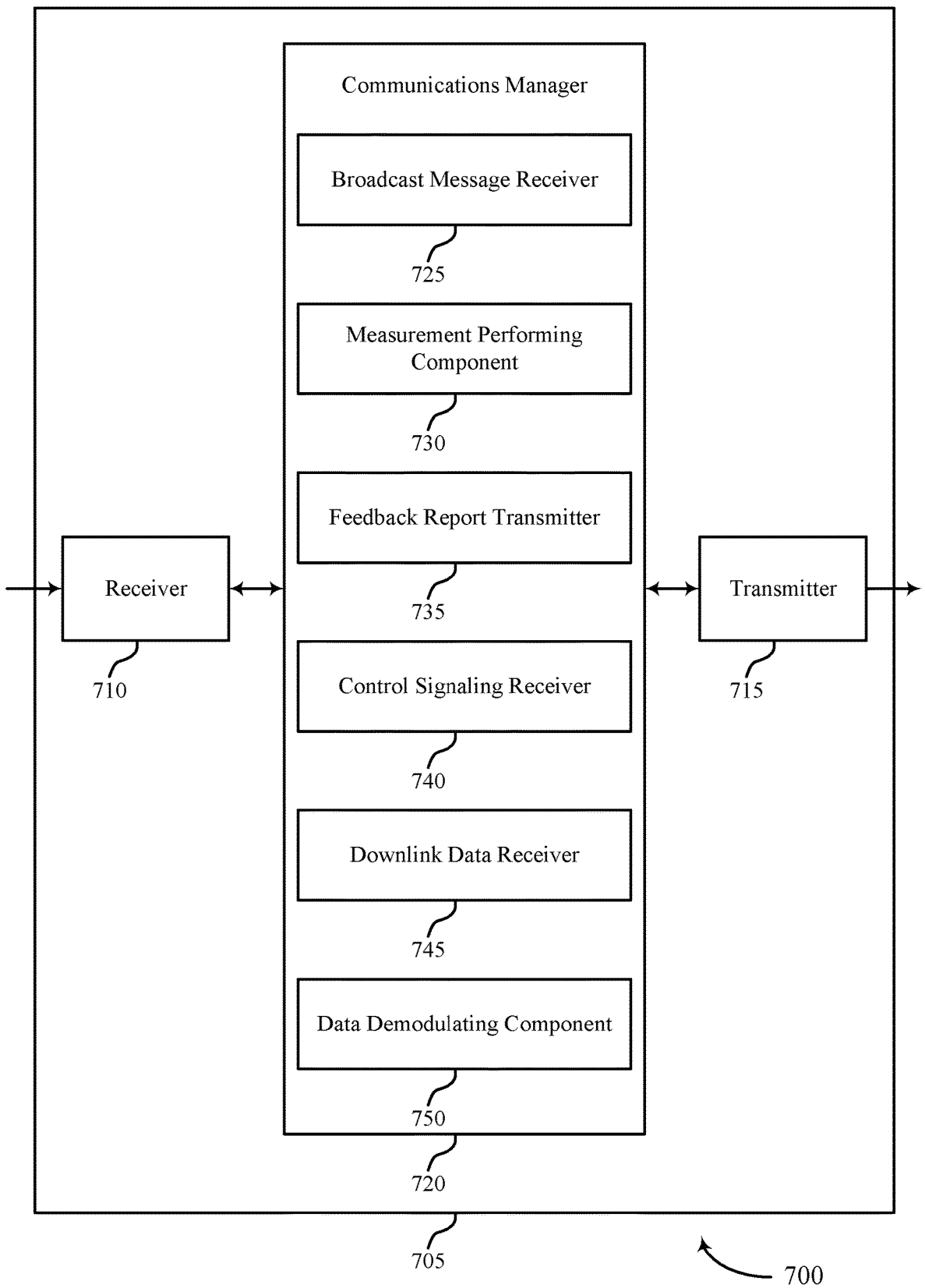

FIG. 7 shows a block diagram 700 of a device 705 that supports techniques for DSS between RATs in accordance with one or more aspects of the present disclosure. The device 705 may be an example of aspects of a device 605 or a UE 115, as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for DSS between RATs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for DSS between RATs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for DSS between RATs as described herein. For example, the communications manager 720 may include a broadcast message receiver 725, a measurement performing component 730, a feedback report transmitter 735, a control signaling receiver 740, a downlink data receiver 745, a data demodulating component 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at the device 705 (e.g., a UE 115) in accordance with examples disclosed herein. The broadcast message receiver 725 may be configured as or otherwise support a means for receiving a broadcast message via a cell associated with a network entity, the broadcast message including an indication that the cell supports a first RAT and a second RAT. The measurement performing component 730 may be configured as or otherwise support a means for performing measurements of one or more reference signals associated with the first RAT based on the indication that the cell supports the first RAT and the second RAT. The feedback report transmitter 735 may be configured as or otherwise support a means for transmitting, to the network entity, a channel feedback report associated with the second RAT, the channel feedback report including an indication of one or more channel state feedback parameters that are based on the measurements of the one or more reference signals.

Additionally, or alternatively, the communications manager 720 may support wireless communications at the device 705 in accordance with examples disclosed herein. The control signaling receiver 740 may be configured as or otherwise support a means for receiving, via a cell that supports a first RAT and a second RAT, control signaling indicating a DSS configuration for the first RAT and the second RAT, the first RAT associated with a first SCS and the second RAT associated with a second SCS that is different from the first SCS. The downlink data receiver 745 may be configured as or otherwise support a means for receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS. The data demodulating component 750 may be configured as or otherwise support a means for demodulating the first portion of the downlink shared channel data according to the first SCS and the second portion of the downlink shared channel data according to the second SCS.

Figure 8:
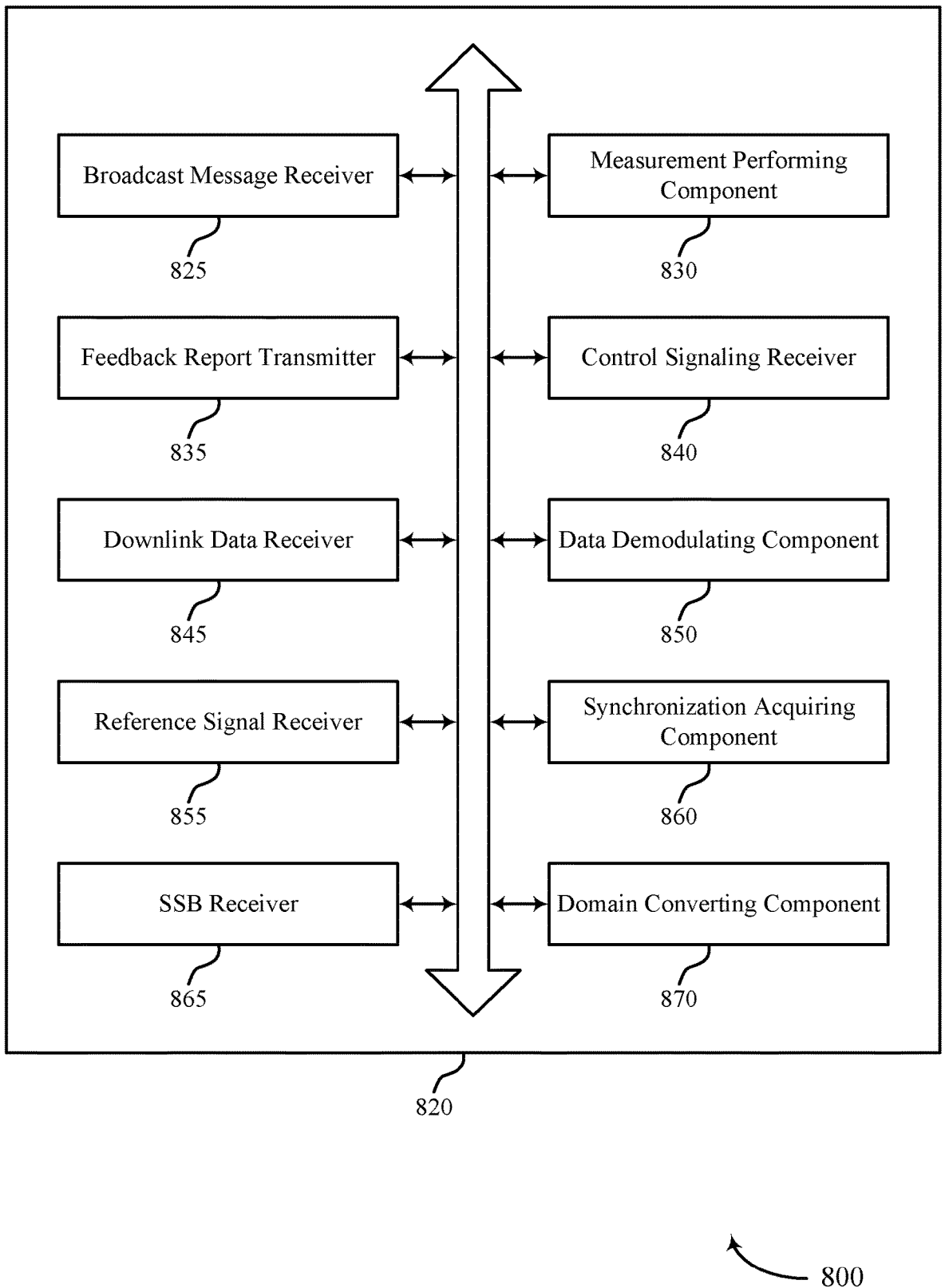
FIG. 8 shows a block diagram of a communications manager that supports techniques for DSS between RATs in accordance with one or more aspects of the present disclosure.

FIG. 8 shows a block diagram 800 of a communications manager 820 that supports techniques for DSS between RATs in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for DSS between RATs as described herein. For example, the communications manager 820 may include a broadcast message receiver 825, a measurement performing component 830, a feedback report transmitter 835, a control signaling receiver 840, a downlink data receiver 845, a data demodulating component 850, a reference signal receiver 855, a synchronization acquiring component 860, an SSB receiver 865, a domain converting component 870, or any combination thereof. Each of these components may communicate, directly or indirectly, with one another (e.g., via one or more buses).

The communications manager 820 may support wireless communications at a UE in accordance with examples disclosed herein. The broadcast message receiver 825 may be configured as or otherwise support a means for receiving a broadcast message via a cell associated with a network entity, the broadcast message including an indication that the cell supports a first RAT and a second RAT. The measurement performing component 830 may be configured as or otherwise support a means for performing measurements of one or more reference signals associated with the first RAT based on the indication that the cell supports the first RAT and the second RAT. The feedback report transmitter 835 may be configured as or otherwise support a means for transmitting, to the network entity, a channel feedback report associated with the second RAT, the channel feedback report including an indication of one or more channel state feedback parameters that are based on the measurements of the one or more reference signals.

In some examples, the reference signal receiver 855 may be configured as or otherwise support a means for receiving the one or more reference signals over at least a subset of a bandwidth of a CC associated with the cell. In some examples, to support receiving the broadcast message, the broadcast message receiver 825 may be configured as or otherwise support a means for receiving the broadcast message via the cell, the broadcast message indicating that the one or more reference signals are applicable to the first RAT and the second RAT. In some examples, to support receiving the broadcast message, the feedback report transmitter 835 may be configured as or otherwise support a means for generating the channel feedback report associated with the second RAT based on the broadcast message.

In some examples, to support receiving the broadcast message, the broadcast message receiver 825 may be configured as or otherwise support a means for receiving the broadcast message that includes a PBCH transmission within an SSB, the PBCH transmission including one or more bits that indicate whether the cell supports the first RAT, the second RAT, or both. In some examples, to support receiving the broadcast message, the broadcast message receiver 825 may be configured as or otherwise support a means for determining that the cell supports the first RAT and the second RAT based on the one or more bits.

In some examples, the synchronization acquiring component 860 may be configured as or otherwise support a means for performing a synchronization procedure for communication with the cell according to the second RAT based on receiving the one or more reference signals via a CC associated with the cell. In some examples, the SSB receiver 865 may be configured as or otherwise support a means for receiving a SSB via a CC associated with the cell, the SSB including the one or more reference signals. In some examples, the synchronization acquiring component 860 may be configured as or otherwise support a means for performing a synchronization procedure for communication with the cell according to the first RAT or the second RAT based on receiving the SSB.

In some examples, to support performing the measurements of the one or more reference signals, the measurement performing component 830 may be configured as or otherwise support a means for performing a set of time-frequency tracking measurements of the one or more reference signals, where the one or more channel state feedback parameters are based on the set of time-frequency tracking measurements. In some examples, the broadcast message receiver 825 may be configured as or otherwise support a means for receiving a second broadcast message via a CC associated with the cell, the second broadcast message including information that is specific to the second RAT.

In some examples, the SSB receiver 865 may be configured as or otherwise support a means for receiving a SSB that indicates a set of time and frequency resources allocated for transmission of the second broadcast message. In some examples, the one or more reference signals include TRSs, CSI-RSs, CRSS, or a combination thereof. In some examples, the first RAT includes a 5G RAT and the second RAT includes a 6G RAT.

Additionally, or alternatively, the communications manager 820 may support wireless communications at a UE in accordance with examples disclosed herein. The control signaling receiver 840 may be configured as or otherwise support a means for receiving, via a cell that supports a first RAT and a second RAT, control signaling indicating a DSS configuration for the first RAT and the second RAT, the first RAT associated with a first SCS and the second RAT associated with a second SCS that is different from the first SCS. The downlink data receiver 845 may be configured as or otherwise support a means for receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS. The data demodulating component 850 may be configured as or otherwise support a means for demodulating the first portion of the downlink shared channel data according to the first SCS and the second portion of the downlink shared channel data according to the second SCS.

In some examples, to support demodulating the downlink shared channel data, the domain converting component 870 may be configured as or otherwise support a means for performing a first time to frequency domain conversion on the first portion of the downlink shared channel data using the first SCS. In some examples, to support demodulating the downlink shared channel data, the domain converting component 870 may be configured as or otherwise support a means for performing a second time to frequency domain conversion on the second portion of the downlink shared channel data using the second SCS.

In some examples, to support receiving the downlink shared channel data, the downlink data receiver 845 may be configured as or otherwise support a means for receiving the first portion of the downlink shared channel data and the second portion of the downlink shared channel data in accordance with a TDM scheme. In some examples, to support receiving the set of reference signals, the reference signal receiver 855 may be configured as or otherwise support a means for receiving, in accordance with the DSS configuration, one or more CRSs or TRSs that are FDM-ed with the first portion of the downlink shared channel data. In some examples, the set of reference signals are applicable to the first RAT and the second RAT. In some examples, the first SCS includes an SCS of fifteen kHz and the second SCS includes an SCS of thirty kHz.

Figure 9:
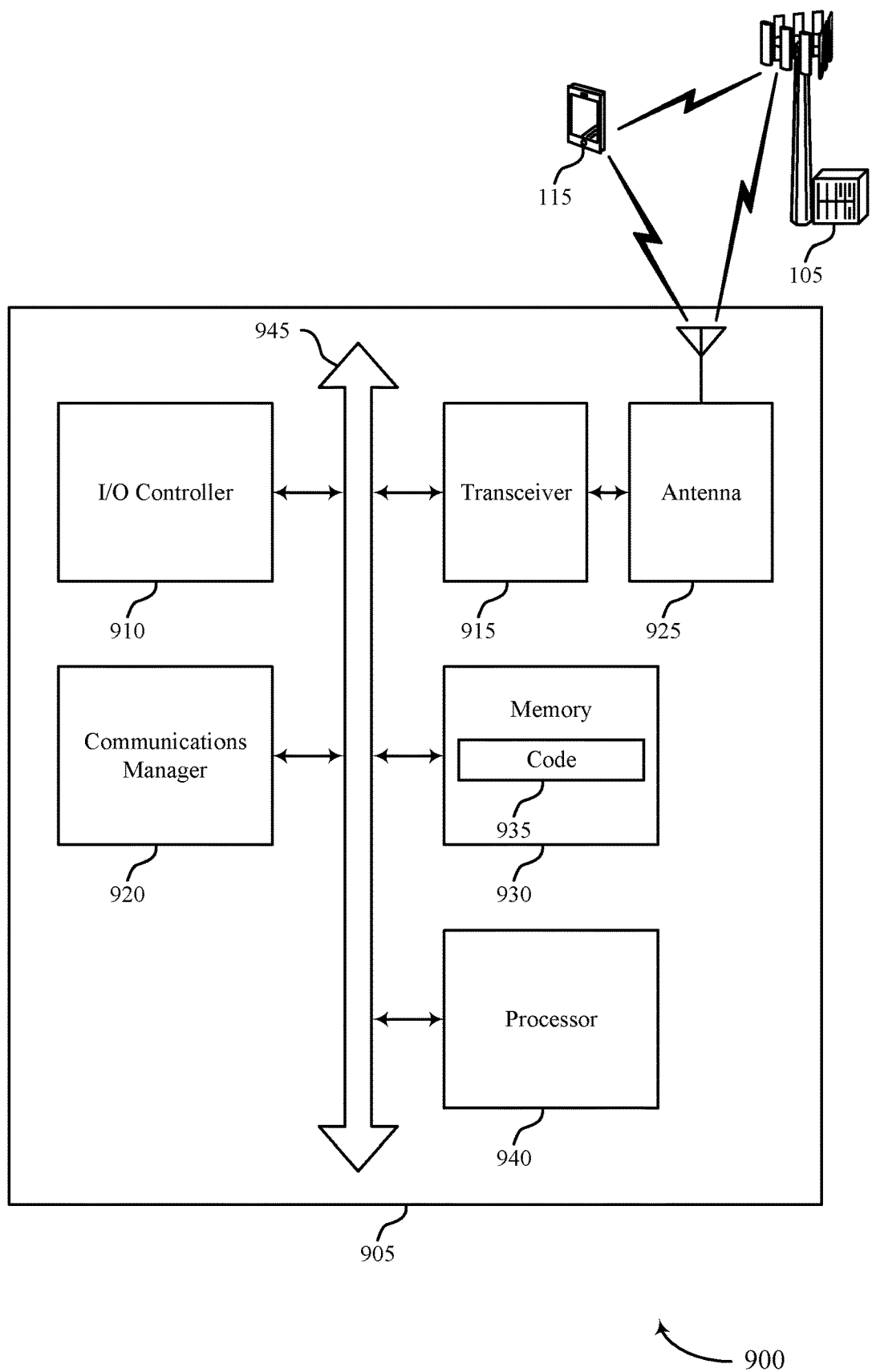
FIG. 9 shows a diagram of a system including a device that supports techniques for DSS between RATs in accordance with one or more aspects of the present disclosure.

FIG. 9 shows a diagram of a system 900 including a device 905 that supports techniques for DSS between RATs in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for DSS between RATs). For example, the device 905 or a component of the device 905 may include a processor 940 and memory 930 coupled with or to the processor 940, the processor 940 and memory 930 configured to perform various functions described herein.

The communications manager 920 may support wireless communications at the device 905 (e.g., a UE 115) in accordance with examples disclosed herein. For example, the communications manager 920 may be configured as or otherwise support a means for receiving a broadcast message via a cell associated with a network entity, the broadcast message including an indication that the cell supports a first RAT and a second RAT. The communications manager 920 may be configured as or otherwise support a means for performing measurements of one or more reference signals associated with the first RAT based on the indication that the cell supports the first RAT and the second RAT. The communications manager 920 may be configured as or otherwise support a means for transmitting, to the network entity, a channel feedback report associated with the second RAT, the channel feedback report including an indication of one or more channel state feedback parameters that are based on the measurements of the one or more reference signals.

Additionally, or alternatively, the communications manager 920 may support wireless communications at the device 905 in accordance with examples disclosed herein. For example, the communications manager 920 may be configured as or otherwise support a means for receiving, via a cell that supports a first RAT and a second RAT, control signaling indicating a DSS configuration for the first RAT and the second RAT, the first RAT associated with a first SCS and the second RAT associated with a second SCS that is different from the first SCS. The communications manager 920 may be configured as or otherwise support a means for receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS. The communications manager 920 may be configured as or otherwise support a means for demodulating the first portion of the downlink shared channel data according to the first SCS and the second portion of the downlink shared channel data according to the second SCS.

By including or configuring the communications manager 920 in accordance with examples as described herein, the device 905 may support techniques for higher throughput by using different numerologies to receive and demodulate different subsets of PDSCH data within a single slot. For example, the device 905 may use a first SCS (e.g., a 5G SCS) to decode a first portion of PDSCH data in the slot, and may use a second SCS (e.g., a 6G SCS) to decode a second portion of PDSCH data in the slot. Thus, the techniques described herein may enable the device 905 to receive PDSCH data that is TDM-ed using different numerologies.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for DSS between RATs as described herein, or the processor 940 and the memory 930 may be otherwise configured to perform or support such operations.

Figure 10:
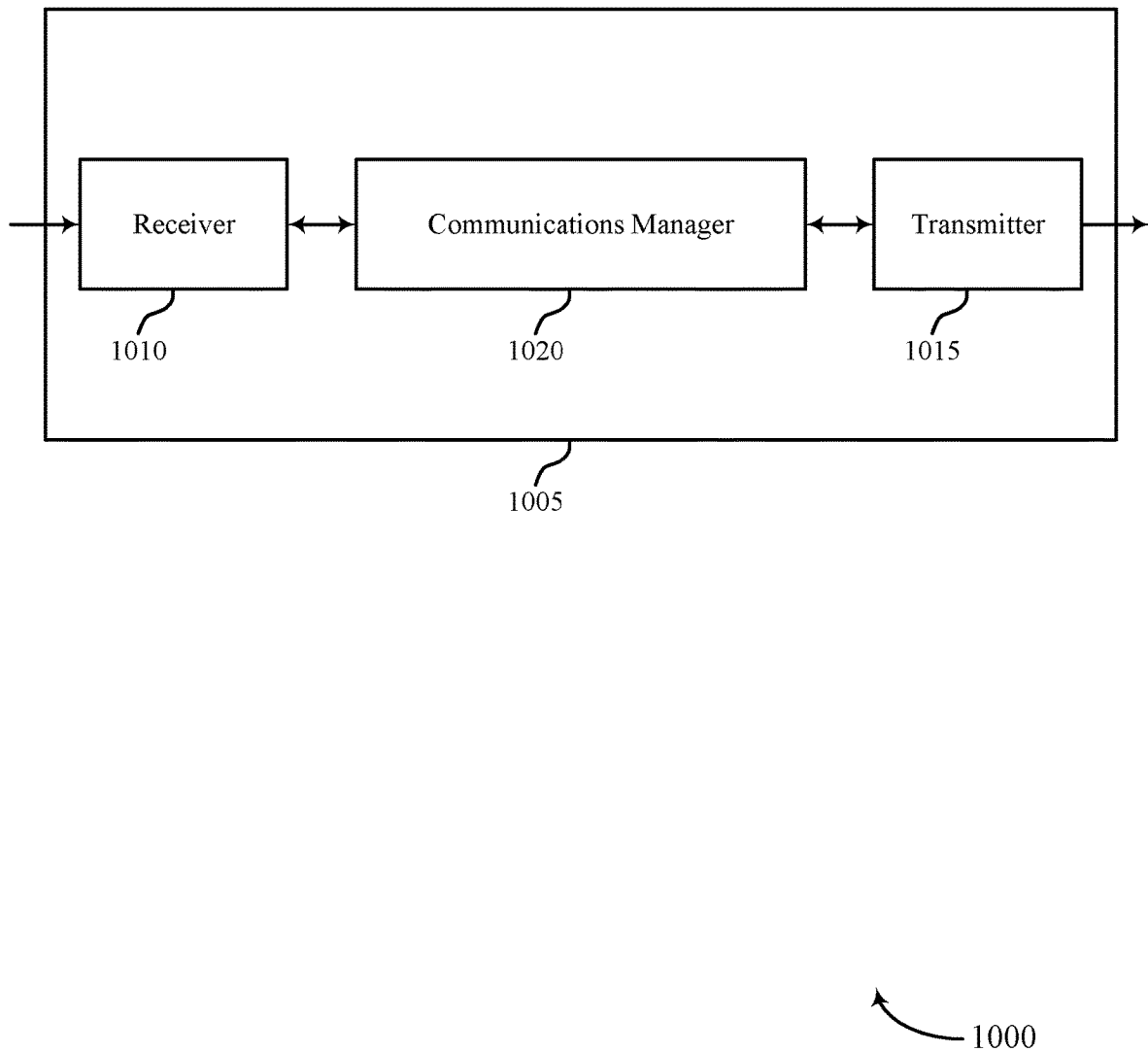
FIGS. 10 and 11 show block diagrams of devices that support techniques for DSS between RATs in accordance with one or more aspects of the present disclosure.

FIG. 10 shows a block diagram 1000 of a device 1005 that supports techniques for DSS between RATs in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for DSS between RATs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for DSS between RATs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for DSS between RATs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at the device 1005 (e.g., a network entity 105) in accordance with examples disclosed herein. For example, the communications manager 1020 may be configured as or otherwise support a means for transmitting a broadcast message via a cell associated with the device 1005, the broadcast message including an indication that the cell supports a first RAT and a second RAT. The communications manager 1020 may be configured as or otherwise support a means for transmitting one or more reference signals associated with the first RAT based on the indication that the cell supports the first RAT and the second RAT. The communications manager 1020 may be configured as or otherwise support a means for receiving, from a UE, a channel feedback report associated with the second RAT, the channel feedback report including an indication of one or more channel state feedback parameters that are based on the one or more reference signals.

Additionally, or alternatively, the communications manager 1020 may support wireless communications at the device 1005 in accordance with examples disclosed herein. For example, the communications manager 1020 may be configured as or otherwise support a means for transmitting, via a cell that supports a first RAT and a second RAT, control signaling indicating a DSS configuration for the first RAT and the second RAT, the first RAT associated with a first SCS and the second RAT associated with a second SCS that is different from the first SCS. The communications manager 1020 may be configured as or otherwise support a means for transmitting, in accordance with the DSS configuration, a set of reference signals and a first portion of downlink shared channel data in a first set of symbols associated with the first SCS. The communications manager 1020 may be configured as or otherwise support a means for transmitting, in accordance with the DSS configuration, a second portion of the downlink shared channel data in a second set of symbols associated with the second SCS.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources by reducing the signaling overhead associated with SSB transmissions and reference signal transmissions in a carrier that supports DSS between 5G and 6G.

Figure 11:
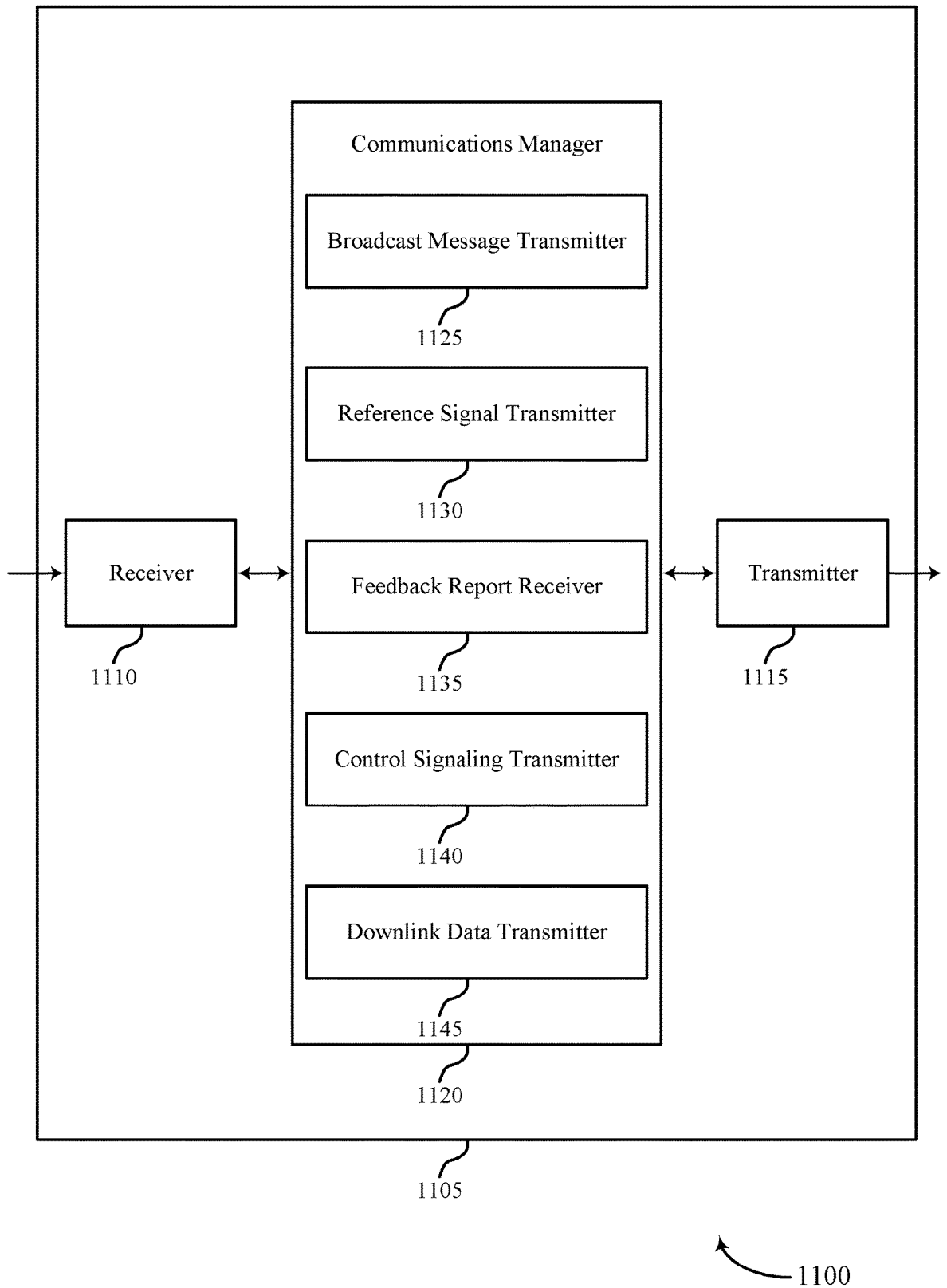

FIG. 11 shows a block diagram 1100 of a device 1105 that supports techniques for DSS between RATs in accordance with one or more aspects of the present disclosure. The device 1105 may be an example of aspects of a device 1005 or a network entity 105, as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for DSS between RATs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for DSS between RATs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for DSS between RATs as described herein. For example, the communications manager 1120 may include a broadcast message transmitter 1125, a reference signal transmitter 1130, a feedback report receiver 1135, a control signaling transmitter 1140, a downlink data transmitter 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at the device 1105 (e.g., a network entity 105) in accordance with examples disclosed herein. The broadcast message transmitter 1125 may be configured as or otherwise support a means for transmitting a broadcast message via a cell associated with the device 1105, the broadcast message including an indication that the cell supports a first RAT and a second RAT. The reference signal transmitter 1130 may be configured as or otherwise support a means for transmitting one or more reference signals associated with the first RAT based on the indication that the cell supports the first RAT and the second RAT. The feedback report receiver 1135 may be configured as or otherwise support a means for receiving, from a UE, a channel feedback report associated with the second RAT, the channel feedback report including an indication of one or more channel state feedback parameters that are based on the one or more reference signals.

Additionally, or alternatively, the communications manager 1120 may support wireless communications at the device 1105 in accordance with examples disclosed herein. The control signaling transmitter 1140 may be configured as or otherwise support a means for transmitting, via a cell that supports a first RAT and a second RAT, control signaling indicating a DSS configuration for the first RAT and the second RAT, the first RAT associated with a first SCS and the second RAT associated with a second SCS that is different from the first SCS. The reference signal transmitter 1130 may be configured as or otherwise support a means for transmitting, in accordance with the DSS configuration, a set of reference signals and a first portion of downlink shared channel data in a first set of symbols associated with the first SCS. The downlink data transmitter 1145 may be configured as or otherwise support a means for transmitting, in accordance with the DSS configuration, a second portion of the downlink shared channel data in a second set of symbols associated with the second SCS.

Figure 12:
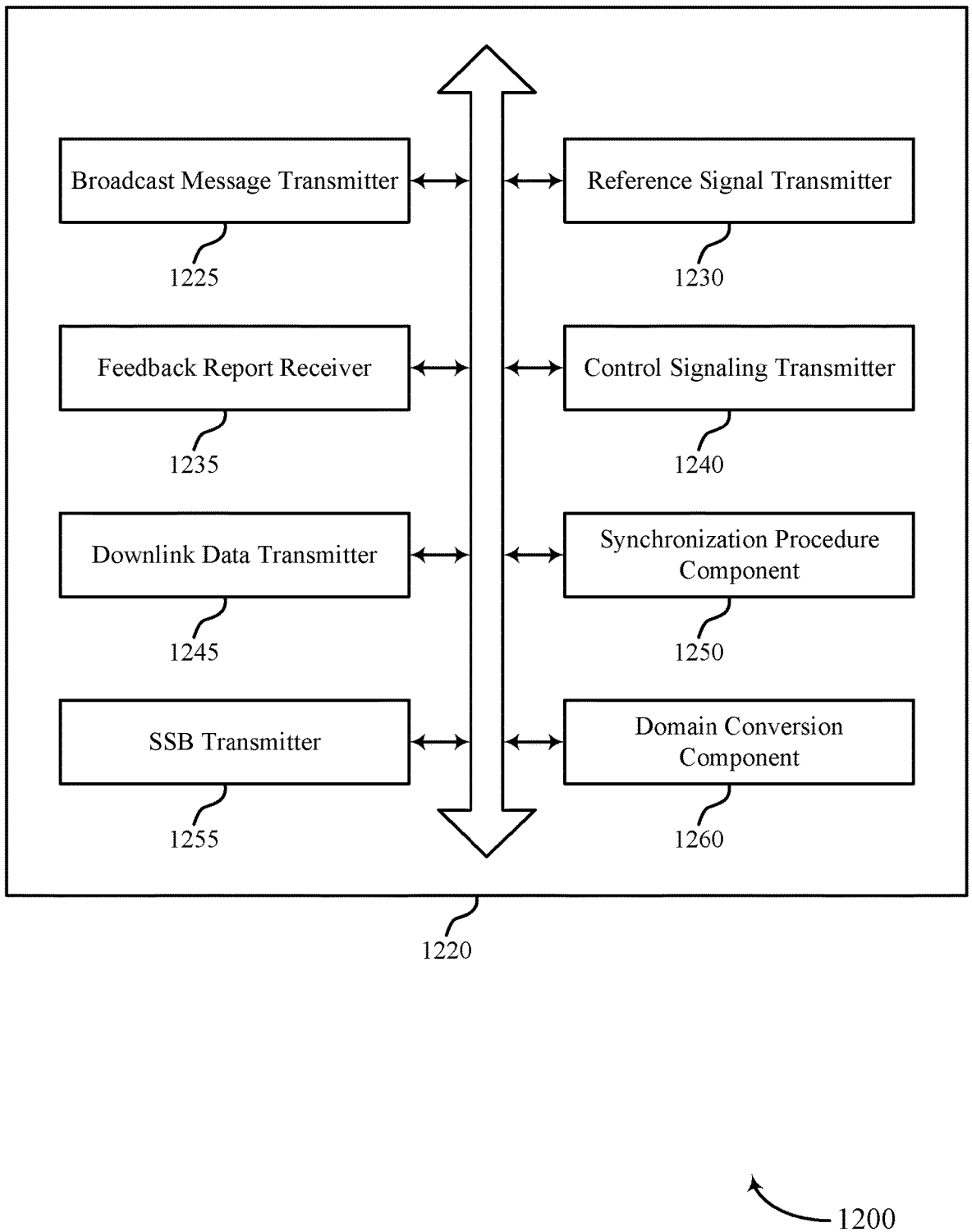
FIG. 12 shows a block diagram of a communications manager that supports techniques for DSS between RATs in accordance with one or more aspects of the present disclosure.

FIG. 12 shows a block diagram 1200 of a communications manager 1220 that supports techniques for DSS between RATs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for DSS between RATs as described herein. For example, the communications manager 1220 may include a broadcast message transmitter 1225, a reference signal transmitter 1230, a feedback report receiver 1235, a control signaling transmitter 1240, a downlink data transmitter 1245, a synchronization procedure component 1250, an SSB transmitter 1255, a domain conversion component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples disclosed herein. The broadcast message transmitter 1225 may be configured as or otherwise support a means for transmitting a broadcast message via a cell associated with the network entity, the broadcast message including an indication that the cell supports a first RAT and a second RAT. The reference signal transmitter 1230 may be configured as or otherwise support a means for transmitting one or more reference signals associated with the first RAT based on the indication that the cell supports the first RAT and the second RAT. The feedback report receiver 1235 may be configured as or otherwise support a means for receiving, from a UE, a channel feedback report associated with the second RAT, the channel feedback report including an indication of one or more channel state feedback parameters that are based on the one or more reference signals.

In some examples, the reference signal transmitter 1230 may be configured as or otherwise support a means for transmitting the one or more reference signals over at least a subset of a bandwidth of a CC associated with the cell. In some examples, to support transmitting the broadcast message, the broadcast message transmitter 1225 may be configured as or otherwise support a means for transmitting the broadcast message via the cell, the broadcast message indicating that the one or more reference signals are applicable to the first RAT and the second RAT, where receiving the channel feedback report associated with the second RAT is based on the broadcast message.

In some examples, to support transmitting the broadcast message, the broadcast message transmitter 1225 may be configured as or otherwise support a means for transmitting the broadcast message that includes a PBCH transmission within a SSB, the PBCH transmission including one or more bits that indicate whether the cell supports the first RAT, the second RAT, or both. In some examples, the synchronization procedure component 1250 may be configured as or otherwise support a means for performing a synchronization procedure for communication with the UE according to the second RAT based on transmitting the one or more reference signals via a CC associated with the cell. In some examples, to support transmitting the broadcast message, the broadcast message transmitter 1225 may be configured as or otherwise support a means for transmitting the broadcast message at a CU of the network entity. For example, the CU may generate the broadcast message for sending to a DU, which may transmit the broadcast message via an RU. In some examples, the network entity may include the DU or the RU.

In some examples, the SSB transmitter 1255 may be configured as or otherwise support a means for transmitting a SSB via a CC associated with the cell, the SSB including the one or more reference signals. In some examples, the synchronization procedure component 1250 may be configured as or otherwise support a means for performing a synchronization procedure for communication with the UE according to the first RAT or the second RAT based on transmitting the SSB.

In some examples, to support receiving the channel feedback report, the feedback report receiver 1235 may be configured as or otherwise support a means for receiving the channel feedback report that includes an indication of the one or more channel state feedback parameters that are based on a set of time-frequency tracking measurements of the one or more reference signals. In some examples, the broadcast message transmitter 1225 may be configured as or otherwise support a means for transmitting a second broadcast message via a CC associated with the cell, the second broadcast message including information that is specific to the second RAT. In some examples, the SSB transmitter 1255 may be configured as or otherwise support a means for transmitting a SSB that indicates a set of time and frequency resources allocated for transmission of the second broadcast message.

Additionally, or alternatively, the communications manager 1220 may support wireless communications at a network entity in accordance with examples disclosed herein. The control signaling transmitter 1240 may be configured as or otherwise support a means for transmitting, via a cell that supports a first RAT and a second RAT, control signaling indicating a DSS configuration for the first RAT and the second RAT, the first RAT associated with a first SCS and the second RAT associated with a second SCS that is different from the first SCS. In some examples, the reference signal transmitter 1230 may be configured as or otherwise support a means for transmitting, in accordance with the DSS configuration, a set of reference signals and a first portion of downlink shared channel data in a first set of symbols associated with the first SCS. The downlink data transmitter 1245 may be configured as or otherwise support a means for transmitting, in accordance with the DSS configuration, a second portion of the downlink shared channel data in a second set of symbols associated with the second SCS.

In some examples, the domain conversion component 1260 may be configured as or otherwise support a means for performing a first frequency to time domain conversion on the set of reference signals and the first portion of the downlink shared channel data using the first SCS, where transmitting the set of reference signals and the first portion of the downlink shared channel data is based on performing the first frequency to time domain conversion. In some examples, the domain conversion component 1260 may be configured as or otherwise support a means for performing a second frequency to time domain conversion on the second portion of the downlink shared channel data using the second SCS, where transmitting the second portion of the downlink shared channel data is based on performing the second frequency to time domain conversion.

In some examples, to support transmitting the downlink shared channel data, the downlink data transmitter 1245 may be configured as or otherwise support a means for transmitting the first portion of the downlink shared channel data and the second portion of the downlink shared channel data in accordance with a TDM scheme. In some examples, to support transmitting the set of reference signals, the reference signal transmitter 1230 may be configured as or otherwise support a means for transmitting, in accordance with the DSS configuration, one or more CRSs or TRSs that are FDM-ed with the first portion of the downlink shared channel data.

Figure 13:
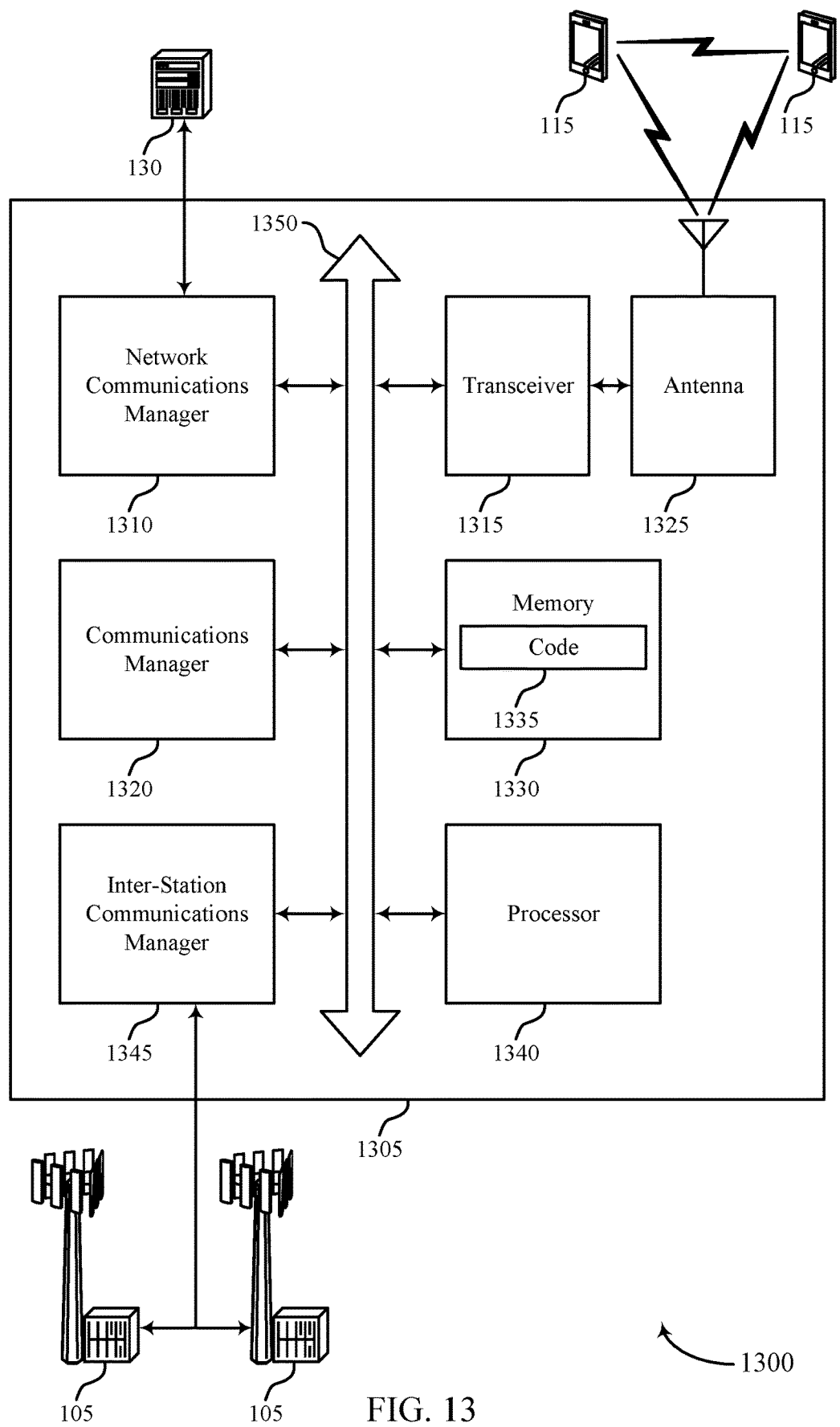
FIG. 13 shows a diagram of a system including a device that supports techniques for DSS between RATs in accordance with one or more aspects of the present disclosure.

FIG. 13 shows a diagram of a system 1300 including a device 1305 that supports techniques for DSS between RATs in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for DSS between RATs). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other network entities 105, and may include a controller or scheduler for controlling communications with UEs 115 in cooperation with other network entities 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entities 105.

The communications manager 1320 may support wireless communications at the device 1305 (e.g., a network entity 105) in accordance with examples disclosed herein. For example, the communications manager 1320 may be configured as or otherwise support a means for transmitting a broadcast message via a cell associated with the device 1305, the broadcast message including an indication that the cell supports a first RAT and a second RAT. The communications manager 1320 may be configured as or otherwise support a means for transmitting one or more reference signals associated with the first RAT based on the indication that the cell supports the first RAT and the second RAT. The communications manager 1320 may be configured as or otherwise support a means for receiving, from a UE, a channel feedback report associated with the second RAT, the channel feedback report including an indication of one or more channel state feedback parameters that are based on the one or more reference signals.

Additionally, or alternatively, the communications manager 1320 may support wireless communications at the device 1305 in accordance with examples disclosed herein. For example, the communications manager 1320 may be configured as or otherwise support a means for transmitting, via a cell that supports a first RAT and a second RAT, control signaling indicating a DSS configuration for the first RAT and the second RAT, the first RAT associated with a first SCS and the second RAT associated with a second SCS that is different from the first SCS. The communications manager 1320 may be configured as or otherwise support a means for transmitting, in accordance with the DSS configuration, a set of reference signals and a first portion of downlink shared channel data in a first set of symbols associated with the first SCS. The communications manager 1320 may be configured as or otherwise support a means for transmitting, in accordance with the DSS configuration, a second portion of the downlink shared channel data in a second set of symbols associated with the second SCS.

By including or configuring the communications manager 1320 in accordance with examples as described herein, the device 1305 may support techniques for higher throughput by using different numerologies to modulate and transmit different subsets of PDSCH data within a single slot. For example, the device 1305 may use a first SCS (e.g., a 5G SCS) to modulate a first portion of PDSCH data in the slot, and may use a second SCS (e.g., a 6G SCS) to modulate a second portion of PDSCH data in the slot. Thus, the techniques described herein may enable the device 1305 to TDM different portions of PDSCH data using different numerologies.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for DSS between RATs as described herein, or the processor 1340 and the memory 1330 may be otherwise configured to perform or support such operations.

Figure 14:
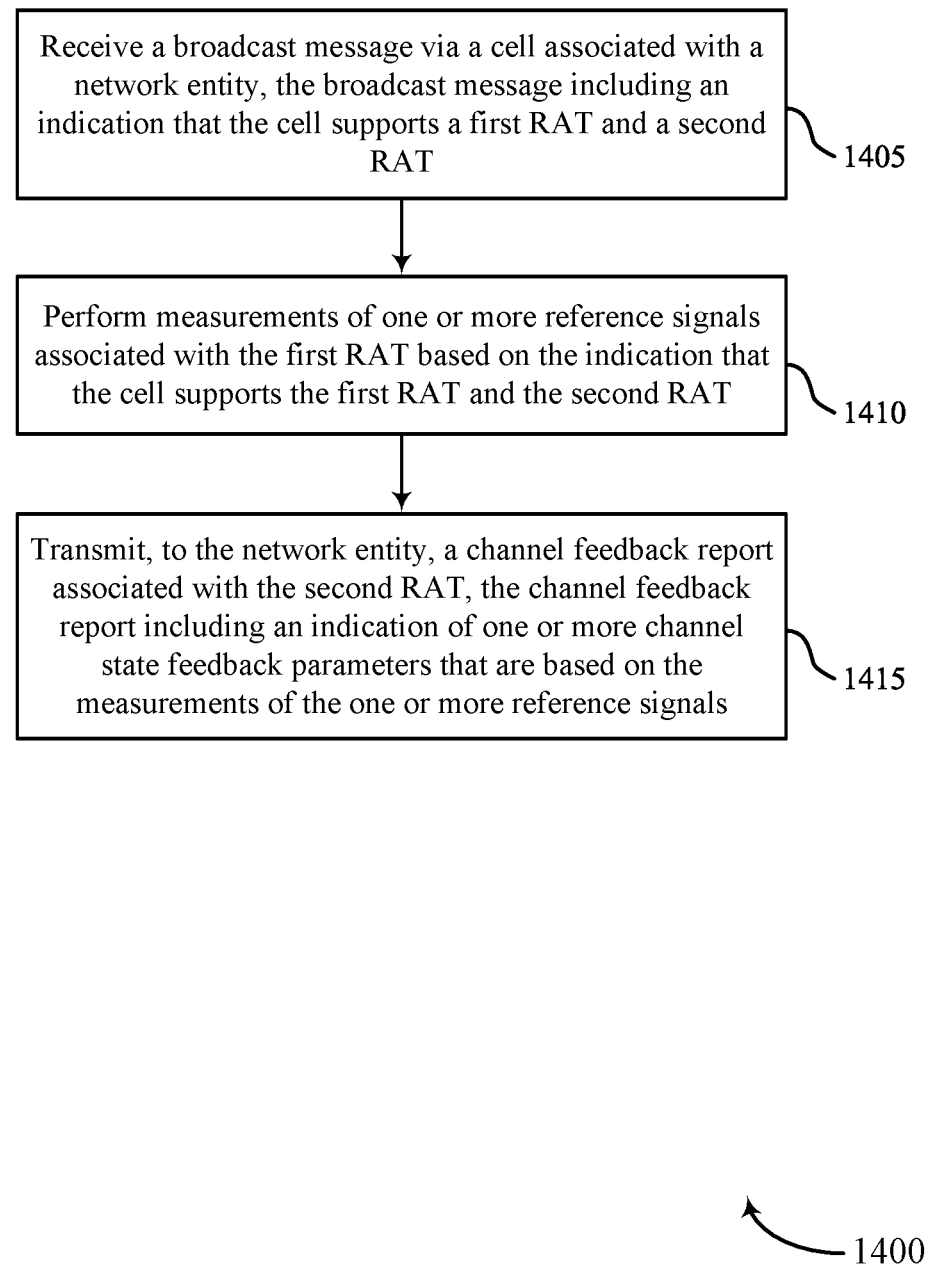
FIGS. 14 through 17 show flowcharts illustrating methods that support techniques for DSS between RATs in accordance with one or more aspects of the present disclosure.

FIG. 14 shows a flowchart illustrating a method 1400 that supports techniques for DSS between RATs in accordance with one or more aspects of the present disclosure. The operations of the method 1400 may be implemented by a UE or various components of a UE, as described herein. For example, the operations of the method 1400 may be performed by a UE 115 described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a broadcast message via a cell associated with a network entity, the broadcast message including an indication that the cell supports a first RAT and a second RAT. The operations of 1405 may be performed in accordance with examples disclosed herein. In some examples, aspects of the operations of 1405 may be performed by a broadcast message receiver 825, as described with reference to FIG. 8.

At 1410, the method may include performing measurements of one or more reference signals associated with the first RAT based on the indication that the cell supports the first RAT and the second RAT. The operations of 1410 may be performed in accordance with examples disclosed herein. In some examples, aspects of the operations of 1410 may be performed by a measurement performing component 830, as described with reference to FIG. 8.

At 1415, the method may include transmitting, to the network entity, a channel feedback report associated with the second RAT, the channel feedback report including an indication of one or more channel state feedback parameters that are based on the measurements of the one or more reference signals. The operations of 1415 may be performed in accordance with examples disclosed herein. In some examples, aspects of the operations of 1415 may be performed by a feedback report transmitter 835, as described with reference to FIG. 8.

Figure 15:
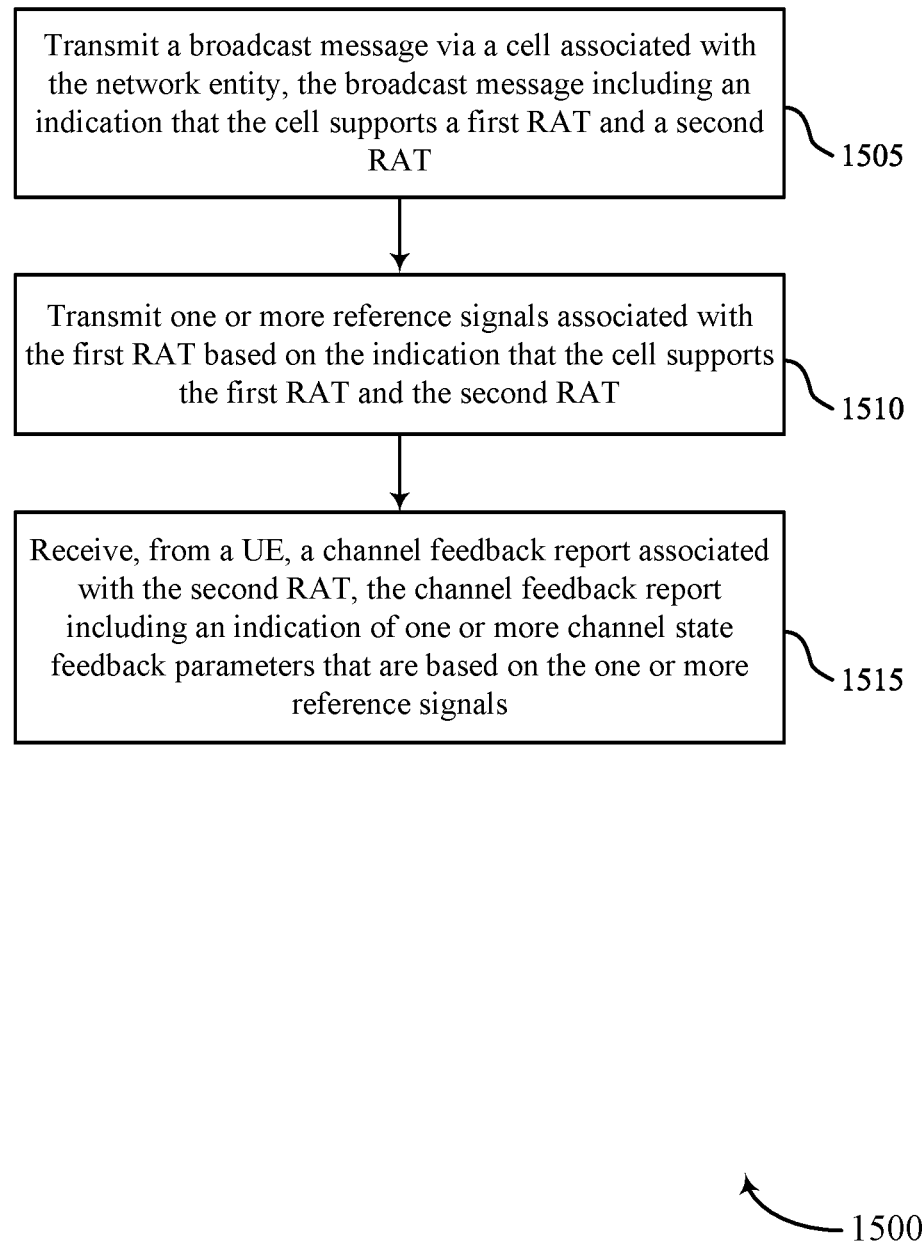

FIG. 15 shows a flowchart illustrating a method 1500 that supports techniques for DSS between RATs in accordance with one or more aspects of the present disclosure. The operations of the method 1500 may be implemented by a network entity or various components of a network entity, as described herein. For example, the operations of the method 1500 may be performed by a network entity 105 described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a broadcast message via a cell associated with the network entity, the broadcast message including an indication that the cell supports a first RAT and a second RAT. The operations of 1505 may be performed in accordance with examples disclosed herein. In some examples, aspects of the operations of 1505 may be performed by a broadcast message transmitter 1225, as described with reference to FIG. 12.

At 1510, the method may include transmitting one or more reference signals associated with the first RAT based on the indication that the cell supports the first RAT and the second RAT. The operations of 1510 may be performed in accordance with examples disclosed herein. In some examples, aspects of the operations of 1510 may be performed by a reference signal transmitter 1230, as described with reference to FIG. 12.

At 1515, the method may include receiving, from a UE, a channel feedback report associated with the second RAT, the channel feedback report including an indication of one or more channel state feedback parameters that are based on the one or more reference signals. The operations of 1515 may be performed in accordance with examples disclosed herein. In some examples, aspects of the operations of 1515 may be performed by a feedback report receiver 1235, as described with reference to FIG. 12.

Figure 16:
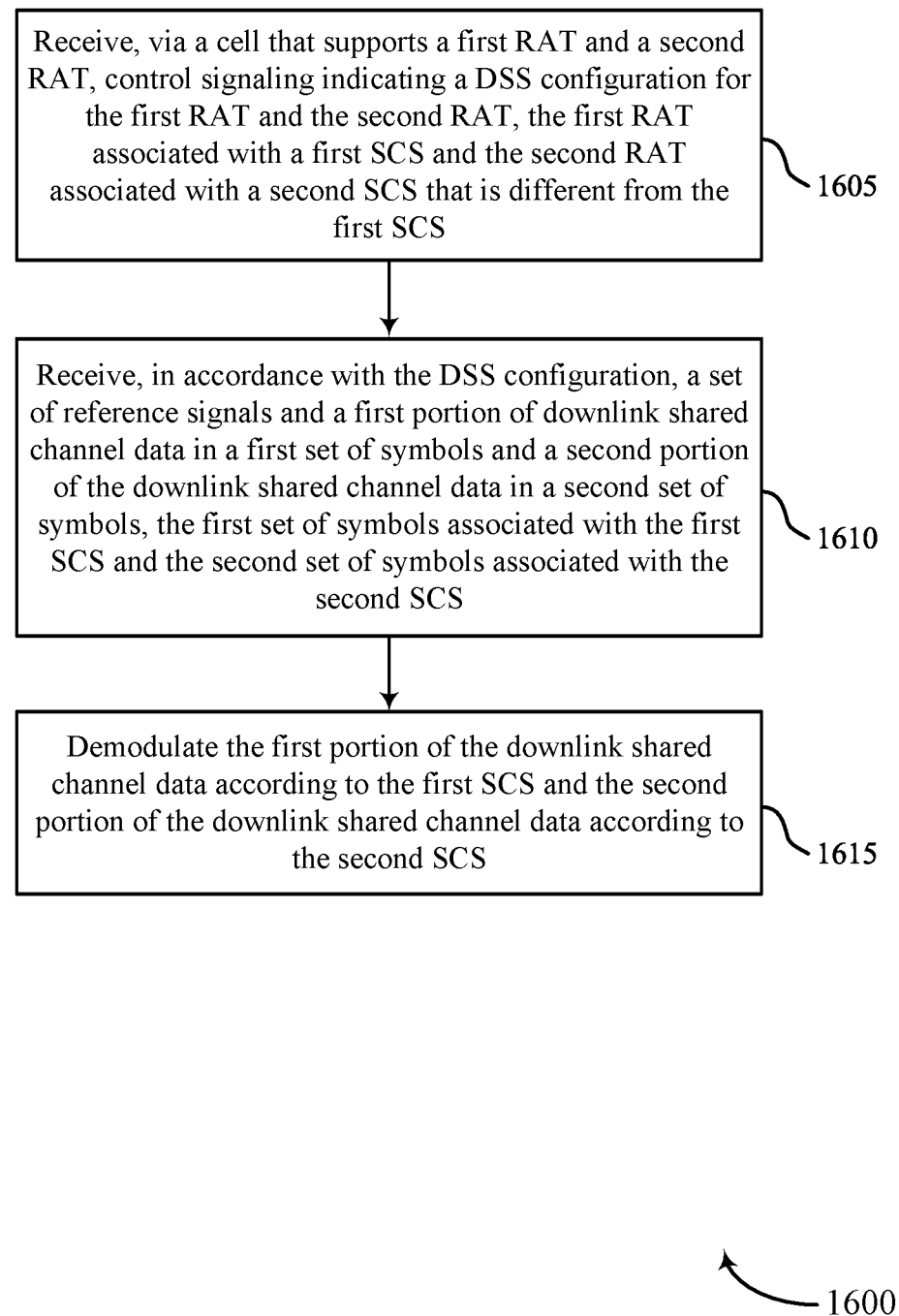

FIG. 16 shows a flowchart illustrating a method 1600 that supports techniques for DSS between RATs in accordance with one or more aspects of the present disclosure. The operations of the method 1600 may be implemented by a UE or various components of a UE, as described herein. For example, the operations of the method 1600 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, via a cell that supports a first RAT and a second RAT, control signaling indicating a DSS configuration for the first RAT and the second RAT, the first RAT associated with a first SCS and the second RAT associated with a second SCS that is different from the first SCS. The operations of 1605 may be performed in accordance with examples disclosed herein. In some examples, aspects of the operations of 1605 may be performed by a control signaling receiver 840, as described with reference to FIG. 8.

At 1610, the method may include receiving, in accordance with the DSS configuration, a set of reference signals and a first portion of downlink shared channel data in a first set of symbols and a second portion of the downlink shared channel data in a second set of symbols, the first set of symbols associated with the first SCS and the second set of symbols associated with the second SCS. The operations of 1610 may be performed in accordance with examples disclosed herein. In some examples, aspects of the operations of 1610 may be performed by a downlink data receiver 845, as described with reference to FIG. 8.

At 1615, the method may include demodulating the first portion of the downlink shared channel data according to the first SCS and the second portion of the downlink shared channel data according to the second SCS. The operations of 1615 may be performed in accordance with examples disclosed herein. In some examples, aspects of the operations of 1615 may be performed by a data demodulating component 850, as described with reference to FIG. 8.

Figure 17:
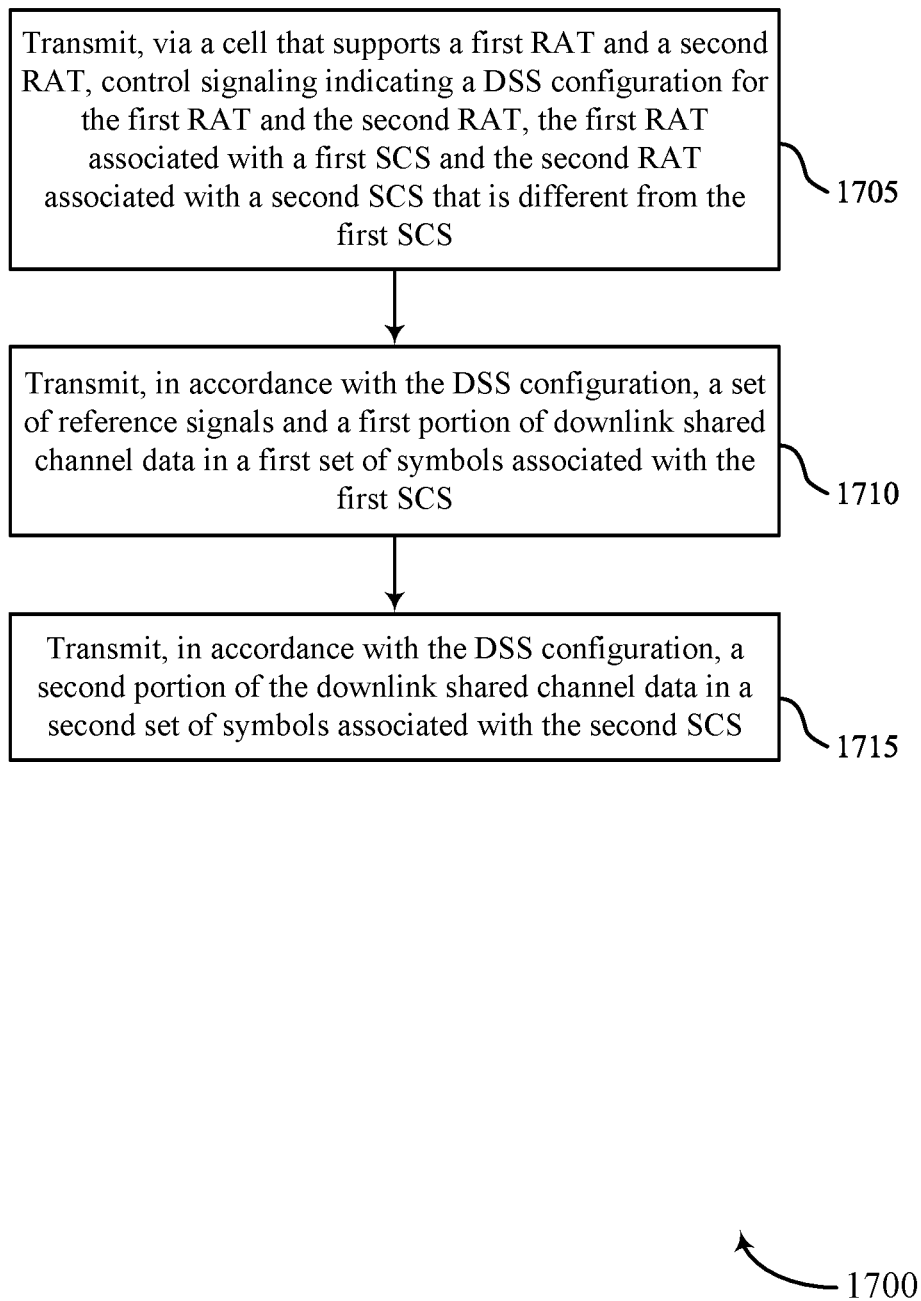

FIG. 17 shows a flowchart illustrating a method 1700 that supports techniques for DSS between RATs in accordance with one or more aspects of the present disclosure. The operations of the method 1700 may be implemented by a network entity or various components of a network entity, as described herein. For example, the operations of the method 1700 may be performed by a network entity 105 described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, via a cell that supports a first RAT and a second RAT, control signaling indicating a DSS configuration for the first RAT and the second RAT, the first RAT associated with a first SCS and the second RAT associated with a second SCS that is different from the first SCS. The operations of 1705 may be performed in accordance with examples disclosed herein. In some examples, aspects of the operations of 1705 may be performed by a control signaling transmitter 1240, as described with reference to FIG. 12.

At 1710, the method may include transmitting, in accordance with the DSS configuration, a set of reference signals and a first portion of downlink shared channel data in a first set of symbols associated with the first SCS. The operations of 1710 may be performed in accordance with examples disclosed herein. In some examples, aspects of the operations of 1710 may be performed by a reference signal transmitter 1230, as described with reference to FIG. 12.

At 1715, the method may include transmitting, in accordance with the DSS configuration, a second portion of the downlink shared channel data in a second set of symbols associated with the second SCS. The operations of 1715 may be performed in accordance with examples disclosed herein. In some examples, aspects of the operations of 1715 may be performed by a downlink data transmitter 1245, as described with reference to FIG. 12.

The following provides an overview of aspects of the present disclosure:

Aspect 1: A method for wireless communications at a UE, comprising: receiving a broadcast message via a cell associated with a network entity, the broadcast message comprising an indication that the cell supports a first radio access technology and a second radio access technology; performing measurements of one or more reference signals associated with the first radio access technology based at least in part on the indication that the cell supports the first radio access technology and the second radio access technology; and transmitting, to the network entity, a channel feedback report associated with the second radio access technology, the channel feedback report comprising an indication of one or more channel state feedback parameters that are based at least in part on the measurements of the one or more reference signals.

Aspect 2: The method of aspect 1, further comprising receiving the one or more reference signals over at least a subset of a bandwidth of a component carrier associated with the cell.

Aspect 3: The method of any of aspects 1 through 2, wherein receiving the broadcast message comprises: receiving the broadcast message via the cell, the broadcast message indicating that the one or more reference signals are applicable to the first radio access technology and the second radio access technology; and generating the channel feedback report associated with the second radio access technology based at least in part on the broadcast message.

Aspect 4: The method of any of aspects 1 through 3, wherein receiving the broadcast message comprises: receiving the broadcast message that comprises a physical broadcast channel transmission within a synchronization signal block, the physical broadcast channel transmission comprising one or more bits that indicate whether the cell supports the first radio access technology, the second radio access technology, or both; and determining that the cell supports the first radio access technology and the second radio access technology based at least in part on the one or more bits.

Aspect 5: The method of any of aspects 1 through 4, further comprising: performing a synchronization procedure for communication with the cell according to the second radio access technology based at least in part on receiving the one or more reference signals via a component carrier associated with the cell.

Aspect 6: The method of any of aspects 1 through 5, further comprising: receiving a synchronization signal block via a component carrier associated with the cell, the synchronization signal block comprising the one or more reference signals; and performing a synchronization procedure for communication with the cell according to the first radio access technology or the second radio access technology based at least in part on receiving the synchronization signal block.

Aspect 7: The method of any of aspects 1 through 6, wherein performing the measurements of the one or more reference signals comprises: performing a set of time-frequency tracking measurements of the one or more reference signals, wherein the one or more channel state feedback parameters are based at least in part on the set of time-frequency tracking measurements.

Aspect 8: The method of any of aspects 1 through 7, further comprising receiving a second broadcast message via a component carrier associated with the cell, the second broadcast message comprising information that is specific to the second radio access technology.

Aspect 9: The method of aspect 8, further comprising receiving a synchronization signal block that indicates a set of time and frequency resources allocated for transmission of the second broadcast message.

Aspect 10: The method of any of aspects 1 through 9, wherein the one or more reference signals comprise tracking reference signals, channel state information reference signals, cell-specific reference signals, or a combination thereof.

Aspect 11: The method of any of aspects 1 through 10, wherein the first radio access technology comprises a fifth generation (5G) radio access technology and the second radio access technology comprises a sixth generation (6G) radio access technology.

Aspect 12: A method for wireless communications at a network entity, comprising: transmitting a broadcast message via a cell associated with the network entity, the broadcast message comprising an indication that the cell supports a first radio access technology and a second radio access technology; transmitting one or more reference signals associated with the first radio access technology based at least in part on the indication that the cell supports the first radio access technology and the second radio access technology; and receiving, from a UE, a channel feedback report associated with the second radio access technology, the channel feedback report comprising an indication of one or more channel state feedback parameters that are based at least in part on the one or more reference signals.

Aspect 13: The method of aspect 12, further comprising transmitting the one or more reference signals over at least a subset of a bandwidth of a component carrier associated with the cell.

Aspect 14: The method of any of aspects 12 through 13, wherein transmitting the broadcast message comprises: transmitting the broadcast message via the cell, the broadcast message indicating that the one or more reference signals are applicable to the first radio access technology and the second radio access technology, wherein receiving the channel feedback report associated with the second radio access technology is based at least in part on the broadcast message.

Aspect 15: The method of any of aspects 12 through 14, wherein transmitting the broadcast message comprises: transmitting the broadcast message that comprises a physical broadcast channel transmission within a synchronization signal block, the physical broadcast channel transmission comprising one or more bits that indicate whether the cell supports the first radio access technology, the second radio access technology, or both.

Aspect 16: The method of any of aspects 12 through 15, further comprising: performing a synchronization procedure for communication with the UE according to the second radio access technology based at least in part on transmitting the one or more reference signals via a component carrier associated with the cell.

Aspect 17: The method of any of aspects 12 through 16, further comprising: transmitting a synchronization signal block via a component carrier associated with the cell, the synchronization signal block comprising the one or more reference signals; and performing a synchronization procedure for communication with the UE according to the first radio access technology or the second radio access technology based at least in part on transmitting the synchronization signal block.

Aspect 18: The method of any of aspects 12 through 17, wherein receiving the channel feedback report comprises: receiving the channel feedback report that comprises an indication of the one or more channel state feedback parameters that are based at least in part on a set of time-frequency tracking measurements of the one or more reference signals.

Aspect 19: The method of any of aspects 12 through 18, further comprising: transmitting a second broadcast message via a component carrier associated with the cell, the second broadcast message comprising information that is specific to the second radio access technology.

Aspect 20: The method of aspect 19, further comprising transmitting a synchronization signal block that indicates a set of time and frequency resources allocated for transmission of the second broadcast message.

Aspect 21: A method for wireless communications at a UE, comprising: receiving, via a cell that supports a first radio access technology and a second radio access technology, control signaling indicating a dynamic spectrum sharing configuration for the first radio access technology and the second radio access technology, the first radio access technology associated with a first subcarrier spacing and the second radio access technology associated with a second subcarrier spacing that is different from the first subcarrier spacing; receiving, in accordance with the dynamic spectrum sharing configuration, a set of reference signals and a first portion of downlink shared channel data in a first set of symbols and a second portion of the downlink shared channel data in a second set of symbols, the first set of symbols associated with the first subcarrier spacing and the second set of symbols associated with the second subcarrier spacing; and demodulating the first portion of the downlink shared channel data according to the first subcarrier spacing and the second portion of the downlink shared channel data according to the second subcarrier spacing.

Aspect 22: The method of aspect 21, wherein demodulating the downlink shared channel data comprises performing a first time to frequency domain conversion on the first portion of the downlink shared channel data using the first subcarrier spacing; and performing a second time to frequency domain conversion on the second portion of the downlink shared channel data using the second subcarrier spacing.

Aspect 23: The method of any of aspects 21 through 22, wherein receiving the downlink shared channel data comprises: receiving the first portion of the downlink shared channel data and the second portion of the downlink shared channel data in accordance with a time division multiplexing scheme.

Aspect 24: The method of any of aspects 21 through 23, wherein receiving the set of reference signals comprises: receiving, in accordance with the dynamic spectrum sharing configuration, one or more cell-specific reference signals or tracking reference signals that are frequency division multiplexed with the first portion of the downlink shared channel data.

Aspect 25: The method of any of aspects 21 through 24, wherein the set of reference signals are applicable to the first radio access technology and the second radio access technology.

Aspect 26: The method of any of aspects 21 through 25, wherein the first subcarrier spacing comprises a subcarrier spacing of fifteen kilohertz and the second subcarrier spacing comprises a subcarrier spacing of thirty kilohertz.

Aspect 27: A method for wireless communications at a network entity, comprising: transmitting, via a cell that supports a first radio access technology and a second radio access technology, control signaling indicating a dynamic spectrum sharing configuration for the first radio access technology and the second radio access technology, the first radio access technology associated with a first subcarrier spacing and the second radio access technology associated with a second subcarrier spacing that is different from the first subcarrier spacing; transmitting, in accordance with the dynamic spectrum sharing configuration, a set of reference signals and a first portion of downlink shared channel data in a first set of symbols associated with the first subcarrier spacing; and transmitting, in accordance with the dynamic spectrum sharing configuration, a second portion of the downlink shared channel data in a second set of symbols associated with the second subcarrier spacing.

Aspect 28: The method of aspect 27, further comprising: performing a first frequency to time domain conversion on the set of reference signals and the first portion of the downlink shared channel data using the first subcarrier spacing, wherein transmitting the set of reference signals and the first portion of the downlink shared channel data is based at least in part on performing the first frequency to time domain conversion; and performing a second frequency to time domain conversion on the second portion of the downlink shared channel data using the second subcarrier spacing, wherein transmitting the second portion of the downlink shared channel data is based at least in part on performing the second frequency to time domain conversion.

Aspect 29: The method of any of aspects 27 through 28, wherein transmitting the downlink shared channel data comprises: transmitting the first portion of the downlink shared channel data and the second portion of the downlink shared channel data in accordance with a time division multiplexing scheme.

Aspect 30: The method of any of aspects 27 through 29, wherein transmitting the set of reference signals comprises: transmitting, in accordance with the dynamic spectrum sharing configuration, one or more cell-specific reference signals or tracking reference signals that are frequency division multiplexed with the first portion of the downlink shared channel data.

Aspect 31: An apparatus for wireless communications at a UE, comprising a processor; memory coupled with the processor; and instructions stored in the memory and executable by the processor to cause the apparatus to perform a method of any of aspects 1 through 11.

Aspect 32: An apparatus for wireless communications at a UE, comprising at least one means for performing a method of any of aspects 1 through 11.

Aspect 33: A non-transitory computer-readable medium storing code for wireless communications at a UE, the code comprising instructions executable by a processor to perform a method of any of aspects 1 through 11.

Aspect 34: An apparatus for wireless communications at a network entity, comprising a processor; memory coupled with the processor; and instructions stored in the memory and executable by the processor to cause the apparatus to perform a method of any of aspects 12 through 20.

Aspect 35: An apparatus for wireless communications at a network entity, comprising at least one means for performing a method of any of aspects 12 through 20.

Aspect 36: A non-transitory computer-readable medium storing code for wireless communications at a network entity, the code comprising instructions executable by a processor to perform a method of any of aspects 12 through 20.

Aspect 37: An apparatus for wireless communications at a UE, comprising a processor; memory coupled with the processor; and instructions stored in the memory and executable by the processor to cause the apparatus to perform a method of any of aspects 21 through 26.

Aspect 38: An apparatus for wireless communications at a UE, comprising at least one means for performing a method of any of aspects 21 through 26.

Aspect 39: A non-transitory computer-readable medium storing code for wireless communications at a UE, the code comprising instructions executable by a processor to perform a method of any of aspects 21 through 26.

Aspect 40: An apparatus for wireless communications at a network entity, comprising a processor; memory coupled with the processor; and instructions stored in the memory and executable by the processor to cause the apparatus to perform a method of any of aspects 27 through 30.

Aspect 41: An apparatus for wireless communications at a network entity, comprising at least one means for performing a method of any of aspects 27 through 30.

Aspect 42: A non-transitory computer-readable medium storing code for wireless communications at a network entity, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a broadcast message via a cell associated with a network entity, the broadcast message comprising an indication that the cell supports a first radio access technology and a second radio access technology and that one or more reference signals are applicable to the first radio access technology and the second radio access technology;
   performing measurements of the one or more reference signals based at least in part on the broadcast message; and
   transmitting, to the network entity, a channel feedback report associated with the second radio access technology, the channel feedback report comprising an indication of one or more channel state feedback parameters that are based at least in part on the measurements of the one or more reference signals.

2. The method of claim 1, further comprising:
   receiving the one or more reference signals over at least a subset of a bandwidth of a component carrier associated with the cell.

3. The method of claim 1, wherein receiving the broadcast message comprises:
   generating the channel feedback report associated with the second radio access technology based at least in part on the broadcast message.

4. The method of claim 1, wherein receiving the broadcast message comprises:
   receiving the broadcast message that comprises a physical broadcast channel transmission within a synchronization signal block, the physical broadcast channel transmission comprising one or more bits that indicate whether the cell supports the first radio access technology, the second radio access technology, or both; and
   determining that the cell supports the first radio access technology and the second radio access technology based at least in part on the one or more bits.

5. The method of claim 1, further comprising:
   performing a synchronization procedure for communication with the cell according to the second radio access technology based at least in part on receiving the one or more reference signals via a component carrier associated with the cell.

6. The method of claim 1, further comprising:
   receiving a synchronization signal block via a component carrier associated with the cell, the synchronization signal block comprising the one or more reference signals; and
   performing a synchronization procedure for communication with the cell according to the first radio access technology or the second radio access technology based at least in part on receiving the synchronization signal block.

7. The method of claim 1, wherein performing the measurements of the one or more reference signals comprises:
   performing a set of time-frequency tracking measurements of the one or more reference signals, wherein the one or more channel state feedback parameters are based at least in part on the set of time-frequency tracking measurements.

8. The method of claim 1, further comprising:
   receiving a second broadcast message via a component carrier associated with the cell, the second broadcast message comprising information that is specific to the second radio access technology.

9. The method of claim 8, further comprising:
   receiving a synchronization signal block that indicates a set of time and frequency resources allocated for transmission of the second broadcast message.

10. The method of claim 1, wherein the one or more reference signals comprise tracking reference signals, channel state information reference signals, cell-specific reference signals, or a combination thereof.

11. The method of claim 1, wherein the first radio access technology comprises a fifth generation (5G) radio access technology and the second radio access technology comprises a sixth generation (6G) radio access technology.

12. A method for wireless communications at a network entity, comprising:
    transmitting a broadcast message via a cell associated with the network entity, the broadcast message comprising an indication that the cell supports a first radio access technology and a second radio access technology and that one or more reference signals are applicable to the first radio access technology and the second radio access technology;
    transmitting the one or more reference signals based at least in part on the broadcast message; and
    receiving, from a user equipment (UE), a channel feedback report associated with the second radio access technology, the channel feedback report comprising an indication of one or more channel state feedback parameters that are based at least in part on the one or more reference signals.

13. The method of claim 12, wherein transmitting the broadcast message further comprises transmitting the broadcast message at a central unit of the network entity, the network entity comprising a distributed unit and a radio unit.

14. The method of claim 12, further comprising:
    transmitting the one or more reference signals over at least a subset of a bandwidth of a component carrier associated with the cell.

15. The method of claim 12, wherein transmitting the broadcast message comprises:
    transmitting the broadcast message that comprises a physical broadcast channel transmission within a synchronization signal block, the physical broadcast channel transmission comprising one or more bits that indicate whether the cell supports the first radio access technology, the second radio access technology, or both.

16. The method of claim 12, further comprising:

performing a synchronization procedure for communication with the UE according to the second radio access technology based at least in part on transmitting the one or more reference signals via a component carrier associated with the cell.

17. The method of claim 12, further comprising:

transmitting a synchronization signal block via a component carrier associated with the cell, the synchronization signal block comprising the one or more reference signals; and performing a synchronization procedure for communication with the UE according to the first radio access technology or the second radio access technology based at least in part on transmitting the synchronization signal block.

18. The method of claim 12, wherein receiving the channel feedback report comprises:

receiving the channel feedback report that comprises an indication of the one or more channel state feedback parameters that are based at least in part on a set of time-frequency tracking measurements of the one or more reference signals.

19. The method of claim 12, further comprising:

transmitting a second broadcast message via a component carrier associated with the cell, the second broadcast message comprising information that is specific to the second radio access technology.

20. A method for wireless communications at a user equipment (UE), comprising:

receiving, via a cell that supports a first radio access technology and a second radio access technology, control signaling indicating a dynamic spectrum sharing configuration for the first radio access technology and the second radio access technology and indicating that a set of reference signals are applicable to the first radio access technology and the second radio access technology, wherein the first radio access technology is associated with a first subcarrier spacing and the second radio access technology is associated with a second subcarrier spacing that is different from the first subcarrier spacing;

receiving, in accordance with the dynamic spectrum sharing configuration, the set of reference signals and a first portion of downlink shared channel data in a first set of symbols and a second portion of the downlink shared channel data in a second set of symbols, the first set of symbols associated with the first subcarrier spacing and the second set of symbols associated with the second subcarrier spacing; and demodulating the first portion of the downlink shared channel data according to the first subcarrier spacing and the second portion of the downlink shared channel data according to the second subcarrier spacing.

21. The method of claim 20, wherein demodulating the downlink shared channel data comprises:

performing a first time to frequency domain conversion on the first portion of the downlink shared channel data using the first subcarrier spacing; and performing a second time to frequency domain conversion on the second portion of the downlink shared channel data using the second subcarrier spacing.

22. The method of claim 20, wherein receiving the downlink shared channel data comprises:

receiving the first portion of the downlink shared channel data and the second portion of the downlink shared channel data in accordance with a time division multiplexing scheme.

23. The method of claim 20, wherein receiving the set of reference signals comprises:

receiving, in accordance with the dynamic spectrum sharing configuration, one or more cell-specific reference signals or tracking reference signals that are frequency division multiplexed with the first portion of the downlink shared channel data.

24. The method of claim 20, wherein the first subcarrier spacing comprises a subcarrier spacing of fifteen kilohertz and the second subcarrier spacing comprises a subcarrier spacing of thirty kilohertz.

25. A method for wireless communications at a network entity, comprising:

transmitting, via a cell that supports a first radio access technology and a second radio access technology, control signaling indicating a dynamic spectrum sharing configuration for the first radio access technology and the second radio access technology and indicating that a set of reference signals are applicable to the first radio access technology and the second radio access technology, wherein the first radio access technology is associated with a first subcarrier spacing and the second radio access technology is associated with a second subcarrier spacing that is different from the first subcarrier spacing;

transmitting, in accordance with the dynamic spectrum sharing configuration, the set of reference signals and a first portion of downlink shared channel data in a first set of symbols associated with the first subcarrier spacing; and transmitting, in accordance with the dynamic spectrum sharing configuration, a second portion of the downlink shared channel data in a second set of symbols associated with the second subcarrier spacing.

26. The method of claim 25, further comprising:

performing a first frequency to time domain conversion on the set of reference signals and the first portion of the downlink shared channel data using the first subcarrier spacing, wherein transmitting the set of reference signals and the first portion of the downlink shared channel data is based at least in part on performing the first frequency to time domain conversion; and performing a second frequency to time domain conversion on the second portion of the downlink shared channel data using the second subcarrier spacing, wherein transmitting the second portion of the downlink shared channel data is based at least in part on performing the second frequency to time domain conversion.

27. The method of claim 25, wherein transmitting the downlink shared channel data comprises:

transmitting the first portion of the downlink shared channel data and the second portion of the downlink shared channel data in accordance with a time division multiplexing scheme.

28. The method of claim 25, wherein transmitting the set of reference signals comprises:

transmitting, in accordance with the dynamic spectrum sharing configuration, one or more cell-specific reference signals or tracking reference signals that are frequency division multiplexed with the first portion of the downlink shared channel data.

\* \* \* \* \*